United States Patent
Yoshida et al.

[11] Patent Number: 5,886,491
[45] Date of Patent: Mar. 23, 1999

[54] POSITION CONTROL UNIT FOR ELECTRIC MOTOR

[75] Inventors: Masahiko Yoshida; Fumio Kumazaki; Tetsuaki Nagano, all of Tokyo, Japan

[73] Assignees: Mitsubishi Denki Kabushiki Kaisha; Mitsubishi Electric Engineering Co., Ltd., both of Tokyo, Japan

[21] Appl. No.: 698,946

[22] Filed: Aug. 16, 1996

[30] Foreign Application Priority Data

Sep. 29, 1995 [JP] Japan .................................. 7-252313

[51] Int. Cl.⁶ .................................................. G05B 13/00
[52] U.S. Cl. ............... 318/592; 318/568.17; 318/568.22; 318/632
[58] Field of Search ..................... 318/560–632

[56] References Cited

U.S. PATENT DOCUMENTS

| | | |
|---|---|---|
| 4,810,941 | 3/1989 | Ohishi et al. . |
| 4,988,935 | 1/1991 | York ................................. 318/568.18 |
| 5,175,479 | 12/1992 | Tajima et al. ........................... 318/560 |
| 5,194,798 | 3/1993 | Hashimoto et al. ..................... 318/594 |
| 5,204,932 | 4/1993 | Shinohara et al. ...................... 388/815 |
| 5,475,291 | 12/1995 | Yoshida et al. .................... 318/568.22 |
| 5,652,495 | 7/1997 | Narazaki et al. ........................ 318/716 |

FOREIGN PATENT DOCUMENTS

| | | |
|---|---|---|
| 62-245312 | 10/1987 | Japan . |
| 1319801 | 12/1989 | Japan . |
| 4299087 | 10/1992 | Japan . |
| 515187 | 1/1993 | Japan . |
| 5308788 | 11/1993 | Japan . |

*Primary Examiner*—David Martin
*Attorney, Agent, or Firm*—Sughrue, Mion, Zinn, Macpeak & Seas, PLLC

[57] ABSTRACT

The present invention provides a position control unit having a torque command computing device (a position control circuit, and a speed control circuit) for outputting a torque command signal (q-axis current command signal Iq*) according to a positional command signal $\theta m*$ given from the outside and a positional detection signal $\theta m$ for an electric motor, and a torque control device (current control circuit) for controlling a torque of the electric motor according to a torque command signal outputted from the torque command computing device, in which the torque control device selects a gain Kqp or a gain Kqi according to whether an absolute value of a positional deviation between the positional command signal $\theta m*$ and the positional detection signal $\theta m$ is larger or smaller than a gain switching reference value P for a positional deviation.

17 Claims, 37 Drawing Sheets

F I G. 2 1
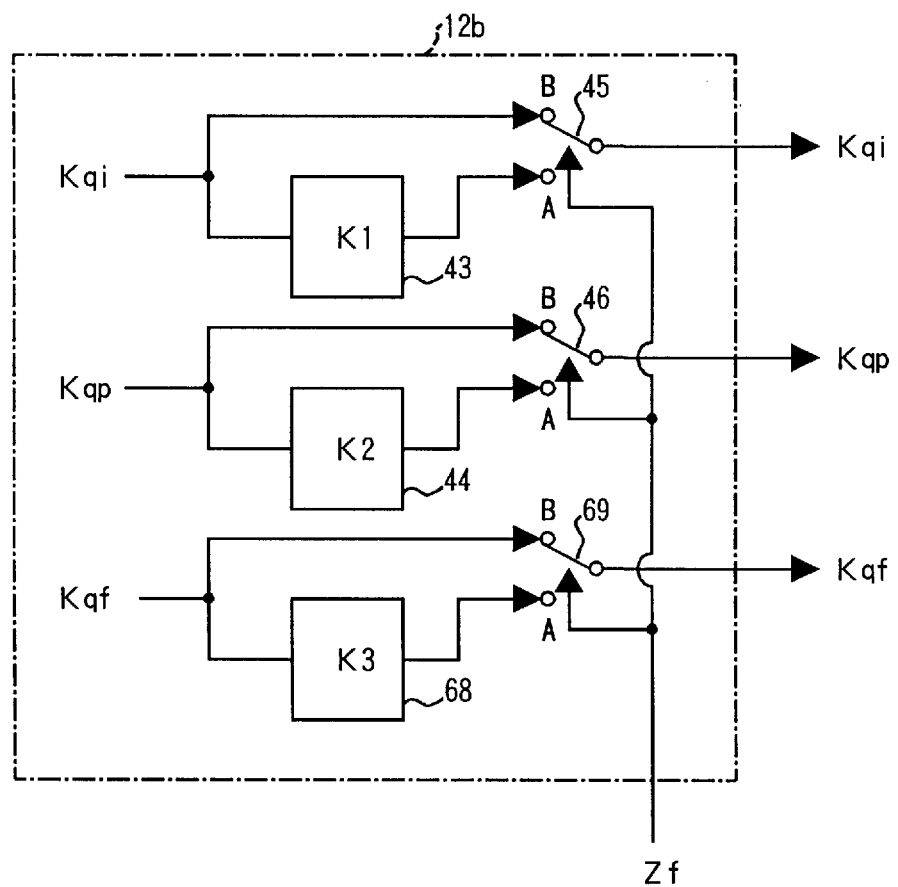

F I G. 3 8
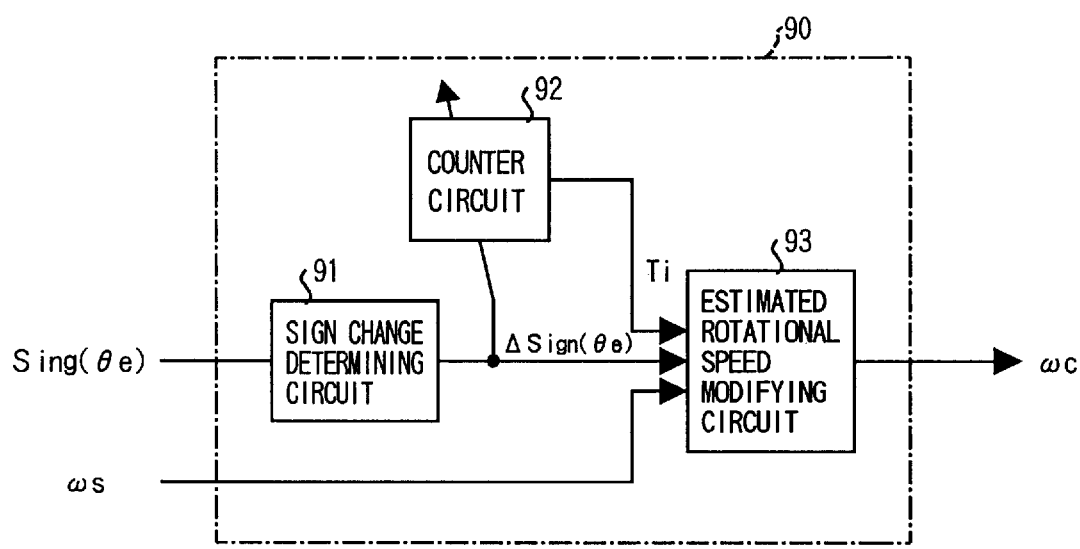

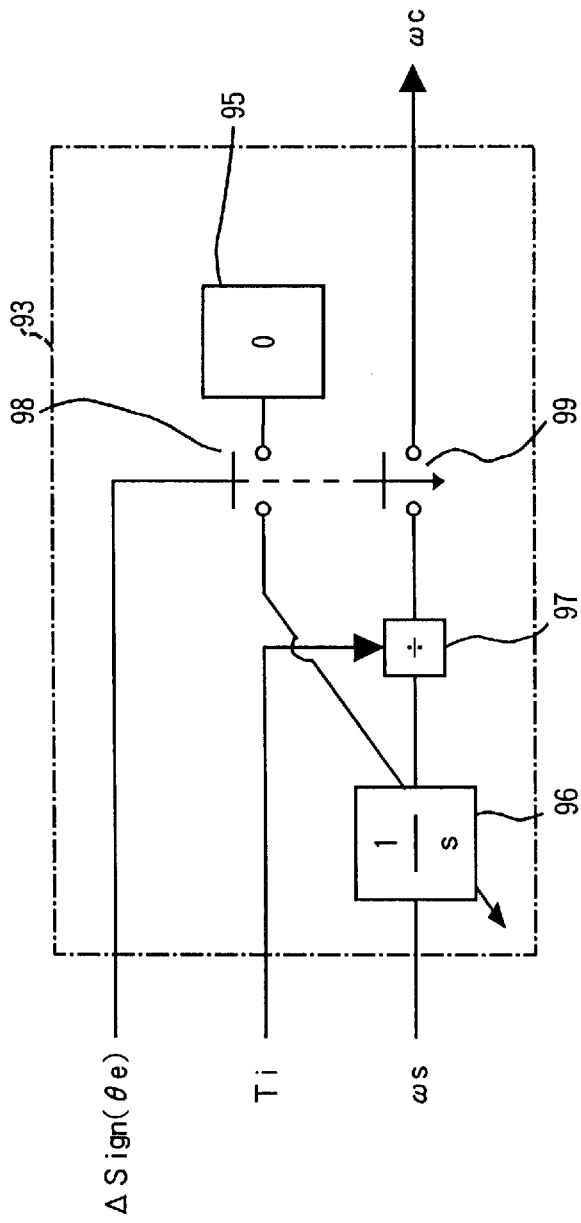
F I G. 3 9

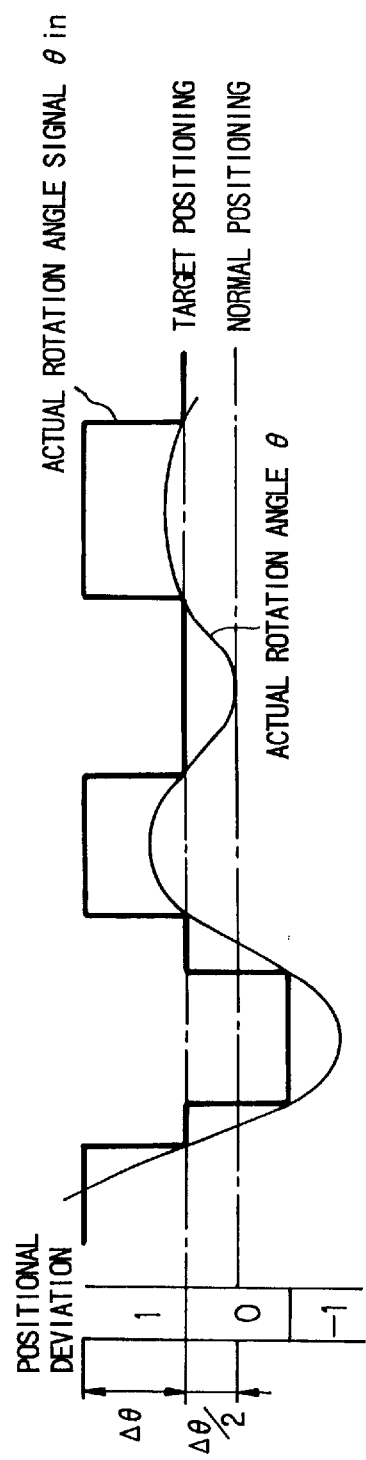

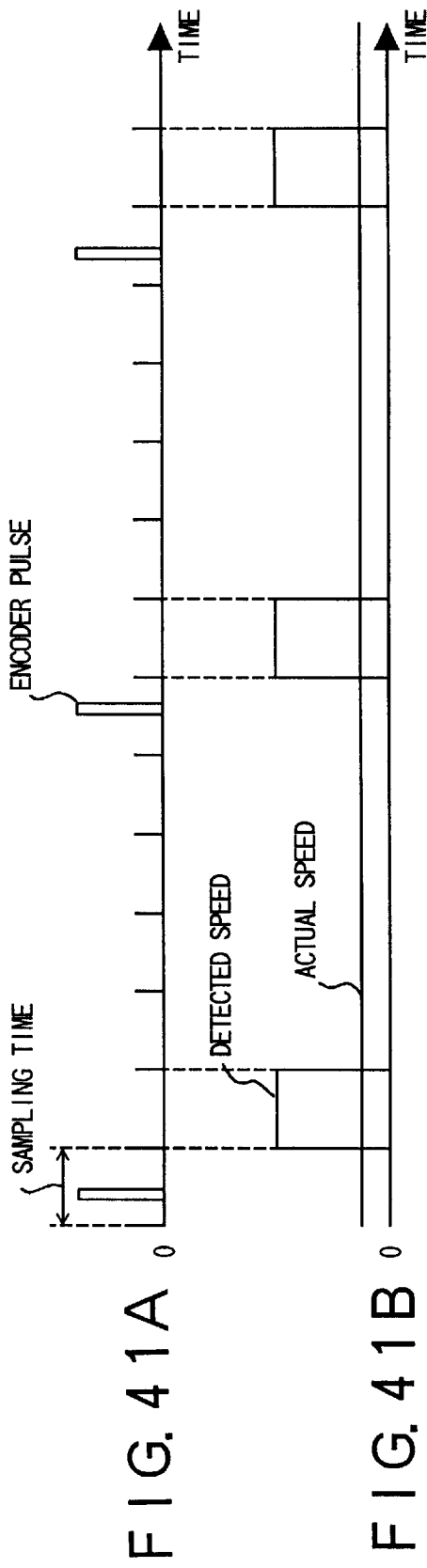

POSITION CONTROL UNIT FOR ELECTRIC MOTOR

FIELD OF THE INVENTION

The present invention relates to a position control unit for an electric motor, and more particularly to a position control unit for an electric motor used in a servo system in which controls for a rotational speed and a position of an electric motor are provided according to the feedback system using a position detector such as a pulse encoder.

BACKGROUND OF THE INVENTION

Positional control for an electric motor in a servo system is generally executed by a control system based on a cascade structure in which a positional control loop is a main loop and a speed control loop and a current control loop are minor loops.

For detecting a rotational speed of an electric motor in the positional control as described above, generally a pulse encoder attached to the electric motor is used and a rotational speed is obtained by dividing a number of output pulses generated within a specified sampling period of time by sampling time.

FIG. 41A and FIG. 41B show a situation where a rotational speed detection is executed in an extremely low rotational speed area in a case in which the speed detection method described above is used. It is assumed that the electric motor rotates at a constant speed. FIG. 41A shows a timing of pulse output from an encoder as well as a timing for sampling, while FIG. 41B shows a rotational speed of the electric motor detected according to an output from the encoder and the actual rotational speed.

In an extremely low rotational speed area, as shown in FIG. 41A, as a state where a number of pulses inputted from the pulse encoder within a sampling period is zero is frequently generated, the detected rotational speed is a pulse-like one as shown in FIG. 41B. In a state where rotation of the electric motor is down, the frequency of generation of pulses becomes further lower.

Because the detected rotational speed is a pulse-like one as described above, also an output torque from the electric motor, when a rotational speed control is executed in an extremely low rotational speed area or in a stopped state, becomes pulse-like, and if the gain is made larger, strength of the pulse-like torque also becomes larger, which causes a minute vibration.

It should be noted that the stopped state as defined herein means that positional displacement of an electric motor does from a position decided according to a stop command value within a range specified according to a preset precision, and may be expressed as a stop-instructed state.

As a method of controlling the minute vibration in a stop-instructed state caused due to a particular rotational speed detecting system with a pulse encoder, there has been known a method in which a gain of a speed control loop is made smaller in a stop-instructed state such as a servo lock state, or a method in which a ripple factor included in a detected rotational speed value is made smaller by making larger a time constant of a filter inserted into a speed feedback in a stop-instructed state.

FIG. 42 shows a position control unit for an electric motor disclosed in Japanese Patent Laid-Open No. 245312/1987. This position control unit comprises a position detecting circuit 202 for counting a number of pulses outputted from a pulse encoder 201 attached to an electric motor (servo motor) 1 and outputting a position signal θm for the electric motor 1; a speed detecting circuit 203 for computing a rotational speed of the electric motor 1 depending on a number of pulses received within a prespecified sampling period of time according to the method as described above and outputting a speed signal ωm for the electric motor 1; a position control circuit 204; a speed control circuit 205; a current control circuit 206; a gains switching circuit 207; and a current detector 208. It should be noted that a load machine 4 is connected via a torque transmission mechanism 3 to the electric motor 1.

The speed control circuit 205, current control circuit 206, and gain switching circuit 207 are connected to each other through a cascade structure; the position control circuit 204 computes a speed command so that a deviation between a positional command signal θm* given from outside by, for instance, a positional command signal generating circuit and a positional command θm for the electric motor 1 will become smaller and outputs a speed command signal ωm*, the speed control circuit 205 computes a current command so that a deviation between the speed command signal ωm* and the speed signal ωm for the electric motor 1 will become smaller and outputting the current command signal I*; and the current control circuit 206 provides controls so that a current I in the electric motor 1 detected by the current detector 8 will follow the current command signal I*.

The gain switching circuit 207 switches a gain of the speed control circuit 205 to a value smaller than a normal value when it is determined that the electric motor 1 has reached a target value for positional control.

In this position control unit, at a point of time when the electric motor 1 has reached a target value for positional control, namely at a point of time when the stop-instructed state has been effected, the gain switching circuit 207 switches a gain of the speed control circuit 205 to a value smaller than the normal value. With this mechanism, amplitude of a pulse-like current command signal I*, as shown in FIG. 41, outputted from the speed control circuit 205 according to a pulse-like detected rotational speed is suppressed, and generation of a minute vibration is suppressed.

FIG. 43 shows a position control unit for an electric motor disclosed in Japanese Patent Laid-Open No. 308788/1993. In FIG. 43, the same reference numerals are assigned to sections corresponding to those in FIG. 42, and description thereof is omitted herein.

In this position control unit, there are provided a low-pass filter 209 which filters a speed signal ωm from the speed detecting circuit 203, and a time constant switching circuit 210 which switches a time constant for the low-pass filter 209 to a value larger than the normal value when it is determined that the electric motor 1 has reached a target value for positional control.

In this position control unit, at a point of time when the electric motor 1 has reached a target value for positional control, namely at a point of time when the stop-instructed state has been effected, the time constant switching circuit 210 switches a time constant for the low-pass filter 209 to a value larger than the normal value, when a cut-off frequency of the low-pass filter 209 becomes lower than the normal value and also a waveform of the detected speed signal ωm having passed through the low-pass filter becomes smoother, and as a result also a waveform of the current command signal I* outputted from the speed control circuit 205 becomes smoother with generation of the minute vibration described above suppressed.

However, in a case where rigidity of the torque transmission mechanism 3 is low and mechanical resonance between the electric motor 1 and the load machine 4 is generated, sometimes the minute vibration in the stop-instructed state can not be suppressed in the position control unit as described above. A description is made below for the reason.

At first, description is made for the current control system comprising the current control circuit 206 and the current detector 208. The current detecting value I outputted from the current detector 208 generally includes, in addition to a current Im factor for the electric motor 1, a noise factor (described as In hereinafter). For this reason, even when a value of the current command signal I* is zero, the current control circuit 206 tries to provide controls so that the current Im in the electric motor 1 will follow the noise factor In, and for this reason a frequency factor similar to the noise factor In is included in a torque of the electric motor 1.

This noise factor In often shows the characteristics of white noise, and contains a excitation factor for a given mechanical resonance frequency, so that a phenomenon of a minute vibration having a vibration frequency closer to the mechanical resonance frequency is generated in the stop-instructed state. Especially, in a case where an amplitude of a minute vibration in the stop-instructed state is smaller than a 1 pulse factor from the encoder 201, an output from the position detecting circuit 202 or from the speed detecting circuit 203 is zero, so that suppression of this minute vibration is impossible.

As described above, the phenomenon of a minute vibration generated due to a noise factor is generated in an area not under control by the speed control system, so that, in the conventional type of position control unit in which control for suppressing the minute vibration is provided by the speed control system, suppression of the minute vibration is impossible.

As described above, in the conventional type of position control unit, in a case where there is a mechanical resonance between an electric motor and a load machine, it is impossible to suppress a minute vibration in the stop-instructed state generated due to a noise factor in a current control circuit, in other words, in a torque control means, which disables high precision positional control.

SUMMARY OF THE INVENTION

It is an object of the present invention to provide a position control unit for an electric motor which realizes a high speed/high precision positional control by giving a preferable torque control response according to a positional deviation in a servo system to suppress a minute vibration in a stop-instructed state generated due to a noise factor even when there exists a mechanical resonance between an electric motor and a load machine.

In the position control unit for an electric motor according to the present invention, a torque command computing means outputs a torque command signal according to a positional command signal given from the outside and a position detecting signal for an electric motor, a torque control means controls a torque of the electric motor according to the torque command signal, and a gain switching means switches a gain of the torque control means according to whether a deviation between the positional command signal and the position detecting signal is larger or smaller than a reference value for a positional deviation given from the outside.

In the position control unit for an electric motor according to the present invention, a torque command computing means outputs a torque command signal according to a positional command signal given from the outside and a position detecting signal for an electric motor, a torque equivalent detecting means detects various factors of a torque of the electric motor such as a phase current and outputs a torque equivalent signal, a torque control means controls a torque of the electric motor according to the torque command signal and the torque equivalent signal, a reference value setting means sets a reference value for gain switching for a positional deviation to a appropriate value according to the torque equivalent signal detected when the torque control means is not working, and a gain switching means switches a gain for the torque control means according to whether a deviation between the positional command signal and the position detecting signal is larger or smaller than the reference value for gain switching.

In the position control unit for an electric motor according to the present invention, a gain switching means switches a gain for the torque control means, when an absolute value of a deviation between the positional command signal and the position detecting signal is smaller than the reference value for gain switching, namely in the stop-instructed state, to a lower one, and otherwise, namely in the operation-instructed state, to a higher one, and for this reason a gain for the torque control means is set to an appropriate value in the stop-instructed state, namely in a state where suppression of a minute vibration is required, and in the operation-instructed state respectively.

In the position control unit for an electric motor according to the present invention, a torque command computing means outputs a torque command signal according to a positional command signal given from the outside and a position detecting signal for an electric motor, a torque equivalent detecting means detects various factors of a torque of the electric motor such as a phase current, a low-pass filter removes unnecessary high frequency wave elements (noise elements) included in an output from the torque equivalent detecting means, a torque control means controls a torque of the electric motor according to the torque command signal as well as an output from the low-pass filter, and a cut-off frequency switching means switches a cut-off frequency for the low-pass filter according to whether a deviation between the positional command signal and the position detecting signal is larger or smaller than a reference value for cut-off frequency switching for a position.

In the position control unit for an electric motor according to the present invention, a reference value setting means sets the reference value for cut-off frequency switching to an appropriate value according to an output from the torque equivalent detecting means detected when the torque control means is not working.

In the position control unit for an electric motor according to the present invention, by switching a cut-off frequency by a cut-off frequency switching means, a cut-off frequency for the low-pass filter is switched, when an absolute value of a deviation between a positional command signal and a position detecting signal is smaller than the reference value for cut-off frequency switching, to a lower one, and otherwise to a higher one, and a cut-off frequency for a low-pass filter is set to an appropriate value in the stop-instructed state, namely in the state where suppression of a minute vibration is required, and in the operation-instructed state respectively.

In the position control unit for an electric motor according to the present invention, a reference value for gain switching or a reference value for cut-off frequency switching are set to an appropriate value required for determination whether it is in the stop-instructed state or in the operation-instructed state by a reference value setting means according to a high frequency wave factor of the phase current in the electric motor detected by a torque equivalent detecting means when the torque control means is not working.

In the position control unit for an electric motor according to the present invention, a first current compensating means outputs a voltage command in a feedback compensation mode decided by a torque equivalent current command according to the torque command signal as well as by a torque equivalent current according to the torque equivalent signal, and a second current compensating means receives a torque equivalent current command according to a torque command signal and outputs a torque equivalent voltage command in the feed forward compensation mode. A gain for the first current compensating means of those two current compensating means is switched by a gain switching means, when an absolute value of a deviation between the positional command signal and the position detecting signal is smaller than a reference value for gain switching, namely in the stop-instructed state, to a lower one, and otherwise, namely in the operation-instructed state, to a higher one.

In the position control unit for an electric motor according to the present invention, a first current compensating means outputs a voltage command in a feedback compensation mode decided by a torque equivalent current command according to the torque command signal as well as by a torque equivalent current according to the torque equivalent signal, and a second current compensating means receives a torque equivalent current command according to a torque command signal and outputs a torque equivalent voltage command in the feed forward compensation mode. Gains for the two current compensating means are switched by a gain switching means, when an absolute value of a deviation between the positional command signal and the position detecting signal is smaller than a reference value for gain switching, namely in the stop-instructed state, to a lower one, and otherwise, namely in the operation-instructed state, to a higher one.

In the position control unit for an electric motor according to the present invention, a third current compensating means receives a torque equivalent voltage command, modifies the torque equivalent voltage command so that change in the torque equivalent voltage command in gain switching will be smoother, and outputs the modified command.

In the position control unit for an electric motor according to the present invention, a primary delay circuit is operated during gain switching, and the torque equivalent voltage command is modified by the primary delay circuit so that change in the torque equivalent voltage command in gain switching will be smoother, and the modified command is outputted.

In the position control unit for an electric motor according to the present invention, a first vibration suppressing means receives a deviation signal obtained by subtracting the torque equivalent signal from a torque equivalent current command value and outputs a first current compensation signal so that a signal for a given frequency (a frequency at which a mechanical resonance between the electric motor and a load machine is generated) of the deviation signal will become smaller, and a deviation signal obtained by subtracting the first current compensation signal from the torque equivalent current command value is used as a new torque equivalent current command value.

In the position control unit for an electric motor according to the present invention, an integrator in which the gain is set so that a gain of a frequency at which a mechanical resonance between the electric motor and a load machine is generated will not become a high gain integrates a deviation signal obtained by subtracting the torque equivalent signal from the torque equivalent current command value, and in the deviation signal, a signal for a frequency at which a mechanical resonance between the electric motor and a load mechanism is generated will become smaller.

In the position control unit for an electric motor according to the present invention, a first vibration suppressing means receives a deviation signal obtained by subtracting the torque equivalent signal from a torque equivalent current command value and outputs a first current compensation signal so that a signal for a given frequency (a frequency at which a mechanical resonance between the electric motor and a load machine is generated) of the deviation signal will become smaller, and a second vibration suppressing means receives a positional command signal from the outside and an actual rotation angle signal from a rotation detector and outputs a second current compensation signal so that a positional deviation from the target positioning point will become smaller, and a deviation signal obtained by subtracting the second current compensation signal and the first current compensation signal from the torque equivalent current command value is used as a new torque equivalent current command value.

In the position control unit for an electric motor according to the present invention, a positional deviation sign determination circuit outputs a polarity of a positional deviation from a target positioning point according to the positional command signal and the actual rotation angle signal, and gives a specified gain to a polarity output of a positional deviation from the positional deviation sign determining circuit and outputs the second current compensation signal.

In the position control unit for an electric motor according to the present invention, an angular speed estimating means receives a deviation signal obtained by subtracting a torque equivalent current signal from a torque equivalent current command value and outputs an estimated angular speed of the electric motor, a positional deviation sign determination means receives a positional command signal from the outside and an actual rotation angle signal from a rotation detector and outputs a polarity (a sign) of a positional deviation from a target positioning point, and an estimated angular speed correcting means receives a polarity signal of a positional deviation from the positional deviation sign determination means and an estimated angular speed from the angular speed estimating means and corrects the estimated angular speed.

Also a first vibration suppressing means receives an estimated angular speed signal from the angular speed estimating means and outputs a first current compensation signal so that an actual angular speed will be reduced with desired response characteristics, and a second vibration suppressing means receives a polarity signal of a positional deviation from the positional deviation sign determination means and outputs a second current compensation signal so that a positional deviation from an instructed position will be reduced, and a deviation signal obtained by subtracting the second current compensation signal and the first current compensation signal from the torque equivalent current command value is used as a new torque equivalent current command value.

Other objects and features of this invention will become understood from the following description with reference to the accompanying drawings.

BRIEF DESCRIPTION OF THE DRAWINGS

FIG. 21 is a block diagram showing a gain switching section in Embodiment 4 according to the present invention;

FIG. 38 is a block diagram showing an estimated angular speed modifying circuit in Embodiment 8 according to the present invention;

FIG. 39 is a block diagram showing an estimated speed modifying circuit in Embodiment 8 according to the present invention;

FIG. 40 is a graph indicating a relation between a signal outputted from an actual rotation angle of the electric motor and the rotation detector thereof and a target positioning point;

FIGS. 41A and 41B are graphs showing how a speed is detected in a range of extremely low speed;

DESCRIPTION OF THE PREFERRED EMBODIMENTS

Figure 1:
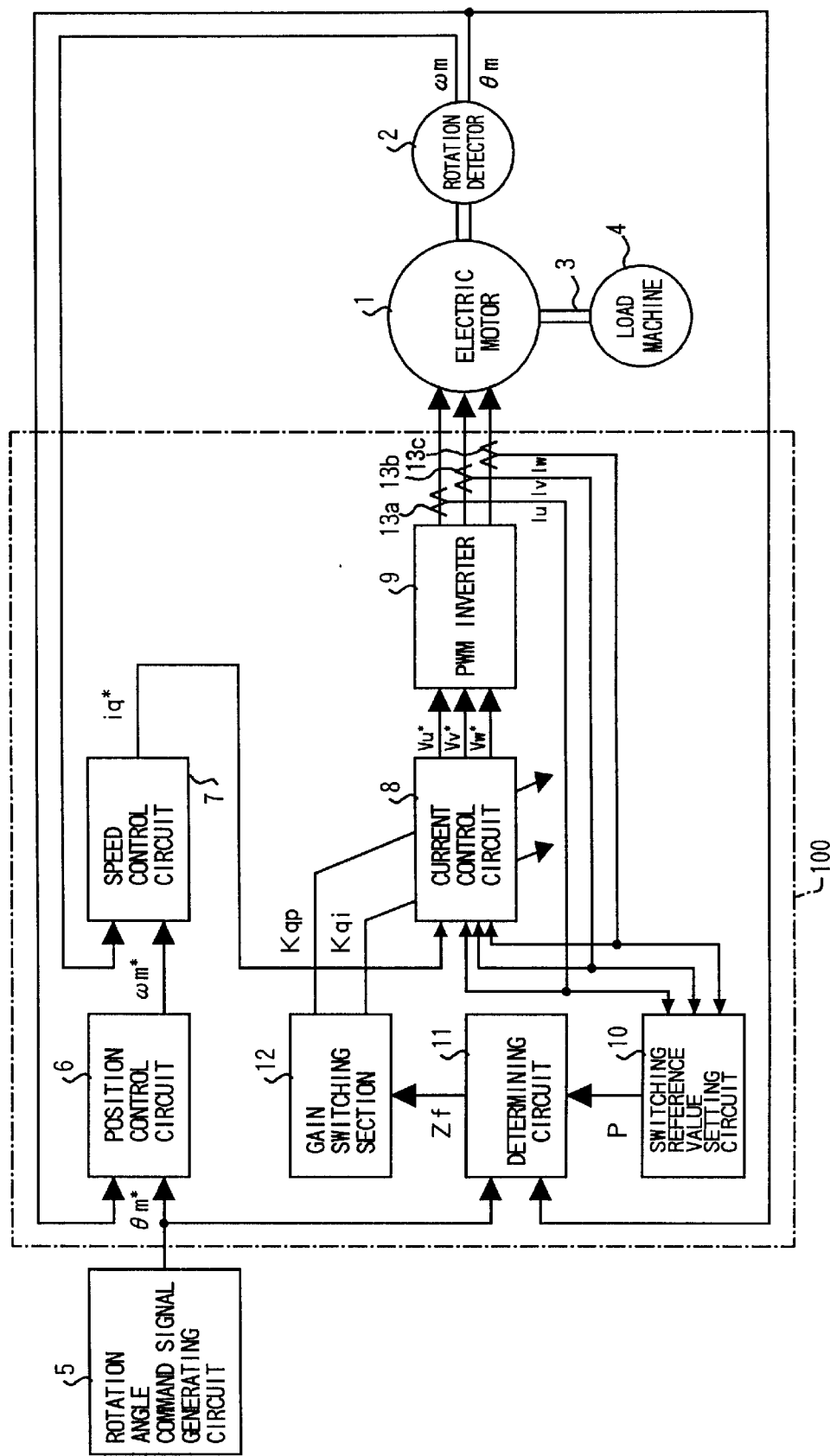
FIG. 1 is a block diagram showing general configuration of Embodiment 1 of a position control unit for an electric motor according to the present invention.

A description is made for a position control unit for an electric motor according to Embodiment 1 of the present invention with reference to FIGS. 1 to 7. FIG. 1 shows the entire configuration of the position control unit for an electric motor according to Embodiment 1. The electric motor 1 is an IM servo motor, and a position control unit 100 comprises a position control circuit 6 for outputting a speed command signal ωm* according to a rotation angle command signal θm* outputted from a rotation angle command signal generating circuit 5 and an actual rotation angle signal θm given from a rotation detector 2; a speed control circuit 7 for outputting a q-axis current command signal Iq*, which is equivalent to a torque command signal, according to a speed command signal ωm* as well as to an actual rotational angular speed signal ωm given by the rotation detector 2; a current control circuit 8 for outputting a U-phase voltage command signal Vu*, a V-phase voltage command signal Vv*, and a W-phase voltage command signal Vw* according to a q-axis current command signal Iq*, a U-phase current Iu, a V-phase current Vv, a W-phase current Iw, a q-axis proportional gain Kqp, and a q-axis integral gain Kqi; and a three-phase voltage type PWM inverter 9 for outputting a PWM voltage command to the electric motor 1 according to the U-phase voltage command signal Vu*, V-phase voltage command signal Vv*, and W-phase voltage command signal Vw*. In this case, the position control circuit 6 and the speed control circuit 7 form a torque command computing means.

Furthermore, the position control unit 100 comprises a switching reference value setting circuit 10 for setting a gain switching reference value P, a determining circuit 11 for outputting a determination signal Zf according to a deviation between a rotation angle command signal θm* and an actual rotation angle signal θm as well as to the gain switching reference value P, and a gain switching section 12 for outputting a q-axis proportional gain Kqp and a q-axis integral gain Kqi according to the determination signal Zf.

A U-phase current Iu, a V-phase current Iv, and a W-phase current Iw each flowing in the electric motor 1 are detected as a torque equivalent signal by the current detectors 13a, 13b, and 13c respectively.

Figure 2:
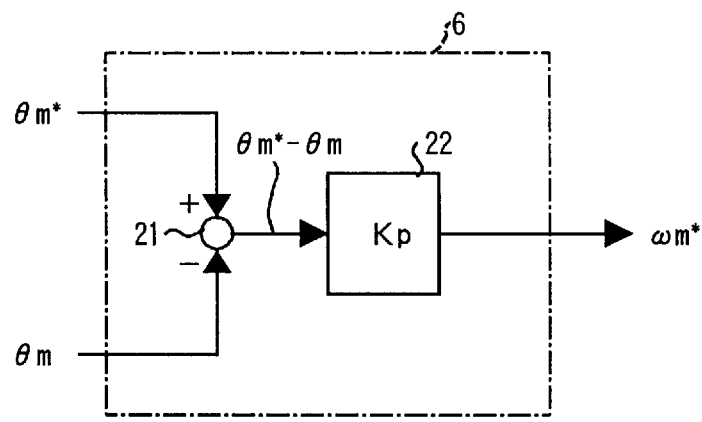
FIG. 2 is a block diagram showing a position control circuit in Embodiment 1 according to the present invention.

The position control circuit 6 comprises, as shown in FIG. 2, a subtracter 21 for outputting a deviation (θm*−θm) between a rotation angle command signal θm* outputted from the rotation angle command signal generating circuit 5 and an actual rotation angle signal θm from the rotation detector 2, and a coefficient multiplier 22 for a gain Kp for proportionally amplifying the deviation (θm*−θm) and for outputting a speed command signal ωm*.

With this configuration, the position control circuit 6 provides controls so that an actual rotation angle signal θm follows a rotation angle command signal θm*.

Figure 3:
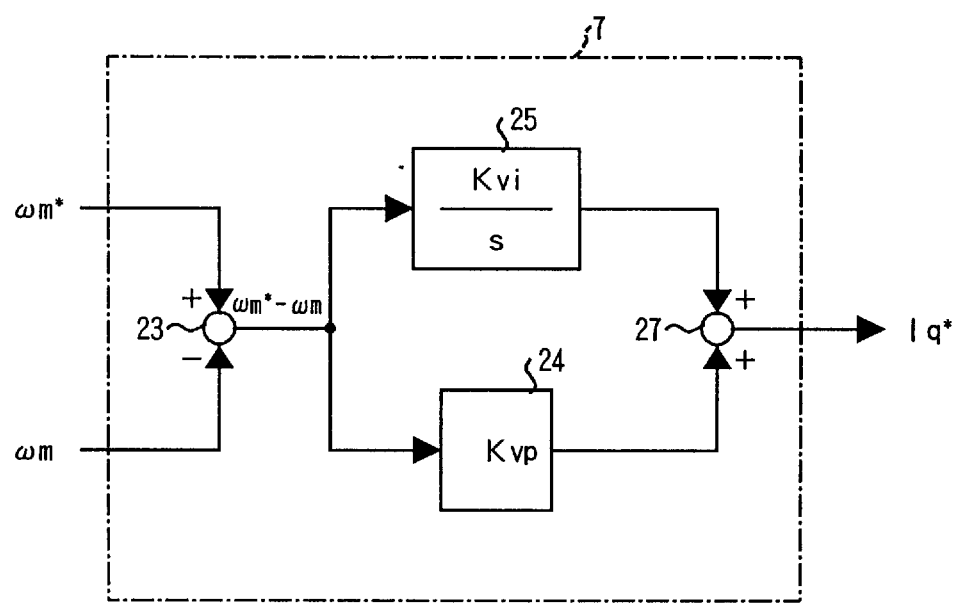
FIG. 3 is a block diagram showing a speed control circuit in Embodiment 1 according to the present invention.

The speed control circuit 7 comprises, as shown in FIG. 3, a subtracter 23 for outputting a deviation (ωm*−ωm) between a speed command signal ωm* and an actual rotational angular speed signal ωm from the rotation detector 2; a coefficient multiplier 24 for a proportional gain Kvp for proportionally amplifying the deviation (ωm*−ωm); an integrator 25 for amplifying the deviation (ωm*−ωm) with an integral gain Kvi; and an adder 27 for summing an output from the coefficient multiplier 24 and an output from the integrator 25 and outputting a q-axis current command signal Iq*.

With this configuration, the speed control circuit 7 outputs a q-axis current command signal Iq* obtained by proportionally amplifying the deviation (ωm*−ωm), so that a speed ωm of the electric motor 1 follows a speed command signal ωm* even in a case where disturbance torque is added thereto.

Figure 4:
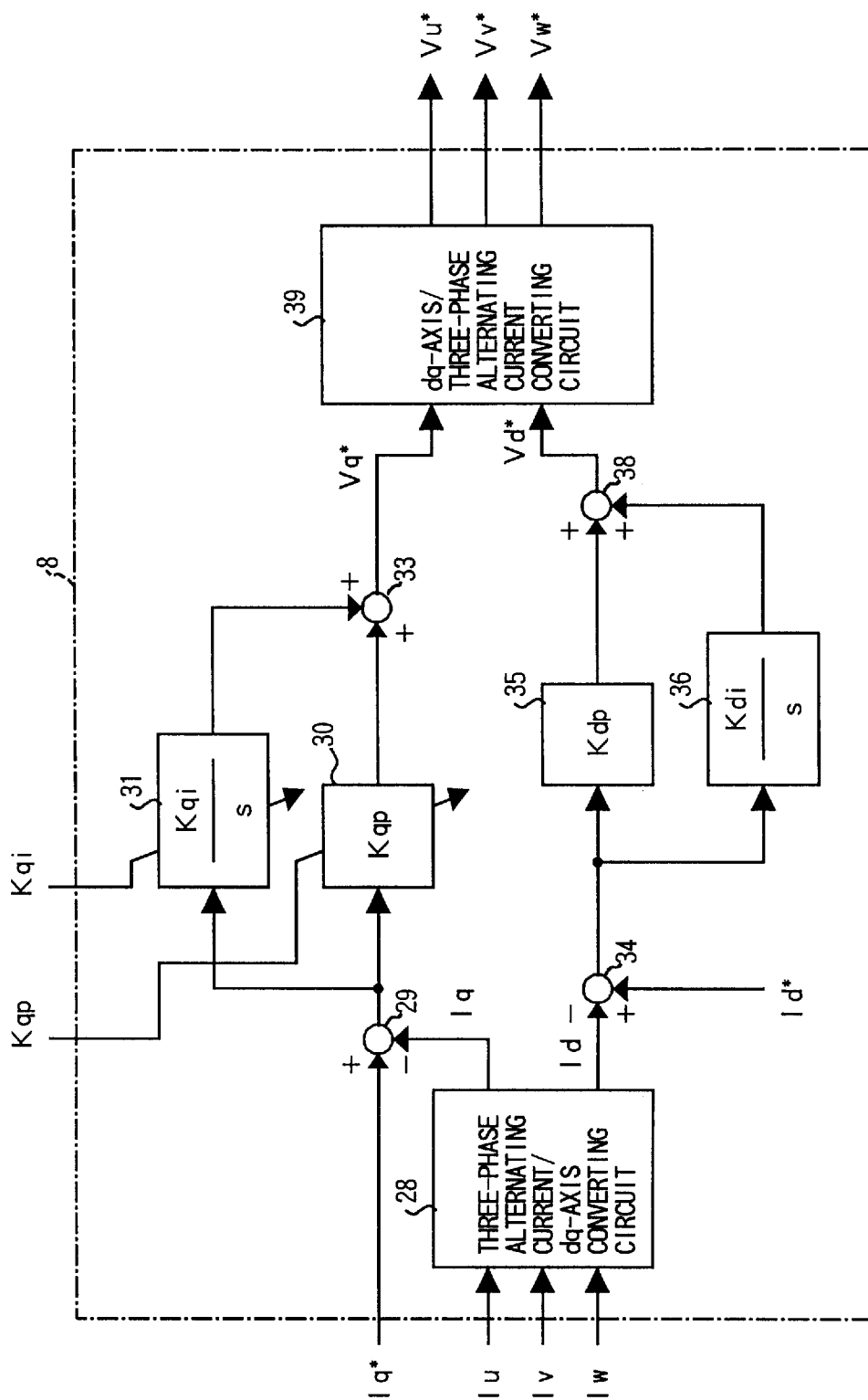
FIG. 4 is a block diagram showing a current control circuit in Embodiment 1 according to the present invention.

The current control circuit 8 which is a torque control means comprises, as shown in FIG. 4, a three-phase alternating current/dq-axis converting circuit 28 for converting a three-phase alternating current such as a U-phase current Iu, V-phase current Iv, and W-phase current Iw for an electric motor 1 to a direct current signal such as a q-axis current signal Iq as well as a d-axis current signal; a subtracter 29 for outputting a deviation (Iq*−Iq) between a q-axis current command signal Iq* and the q-axis current signal Iq; a coefficient multiplier 30 for a proportional gain Kqp for proportionally amplifying the deviation (Iq*−Iq); an integrator 31 for amplifying the deviation (Iq*−Iq) with an integral gain Kqi; an adder 33 for summing an output from the coefficient multiplier 30 and an output from the integrator 31 and outputting a q-axis voltage command signal Vq*; a subtracter 34 for outputting a deviation (Id*−Id) between a d-axis current command signal Id* and a d-axis current signal Id; a coefficient multiplier 35 for a proportional gain Kdp for proportionally amplifying the deviation (Id*−Id); an integrator 36 for amplifying the deviation (Id*−Id) with an integral gain Kdi; an adder 38 for summing up an output from the coefficient multiplier 35 and an output from the integrator 36 and outputting a d-axis voltage command signal Vd*; and a dq-axis/three-phase alternating current converting circuit 39 for outputting a U-phase voltage command signal Vu*, V-phase voltage command signal Vv*, and W-phase voltage command signal Vw* according to a q-axis voltage command signal Vq* as well as a d-axis voltage command signal Vd*.

It should be noted that more detail on the three-phase alternating current/dq-axis conversion and the dq-axis/three-phase alternating conversion will be obtained by referring to, for instance, "The theory of AC servo system and practical design" (Issued by Sougou Denshi Shuppansha), p. 25 to p. 26, if necessary.

As well-known, torque of an electric motor like an IM servo motor can be controlled by the q-axis current command signal Iq*, and the d-axis current command signal Id* is set to "0" so that the electric motor can be operated with the maximum efficiency. With the configuration described above, the current control circuit 8 can be controlled so that torque of the electric motor 1 follows the q-axis current command signal Iq* even in a case where disturbance torque is added thereto.

The gain of the coefficient multiplier 30 as well as integrator 31 described above is switched by q-axis proportional gain Kqp and q-axis integral gain Kqi each outputted from the gain switching section 12.

Figure 5:
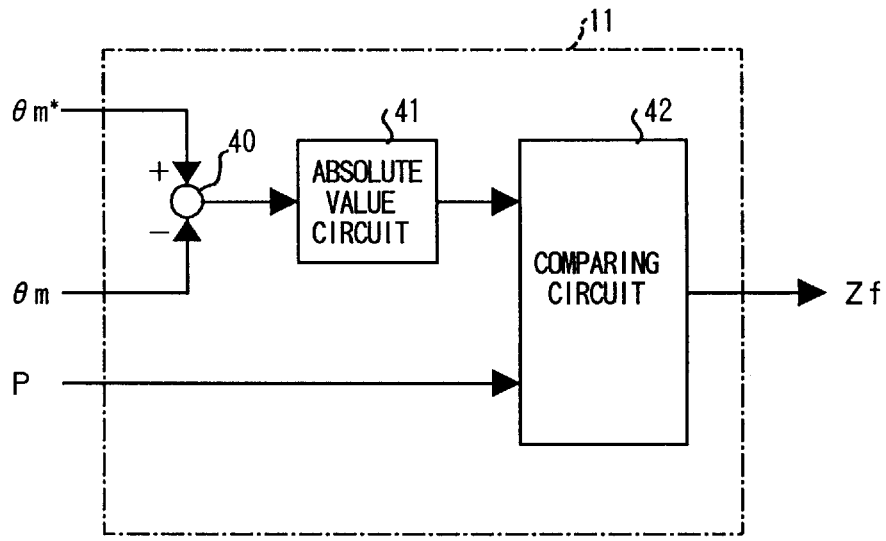
FIG. 5 is a block diagram showing a determining circuit in Embodiment 1 according to the present invention.

A determining circuit 11 comprises, as shown in FIG. 5, a subtracter 40 for outputting a deviation (θm*−θm) between a rotation angle command signal θm* and an actual rotation angle signal θm; an absolute value circuit 41 for outputting an absolute value of the deviation (θm*−θm); and a comparing circuit 42 for outputting a determination signal Zf depending on a result of comparison as to whether an absolute value of the deviation (θm*−θm) is larger or smaller than a reference value P for gain switching set by a switching reference value setting circuit 10.

A determination signal Zf is a binary signal in which the signal will be "0" if it is determined that a case where an electric motor 1 is in a stop-instructed state, namely an absolute value of the deviation (θm*−θm) is smaller than a reference value P for gain switching, and the signal will be "1" if it is determined that a case where an electric motor 1 is in an operation-instructed state, namely an absolute value of the deviation (θm*−θm) is greater than a reference value P for gain switching. Namely, a determination signal Zf determines whether the electric motor 1 is in a stop-instructed state (a minute vibration reduction mode) or in an operation-instructed state (normal operation mode).

Figure 6:
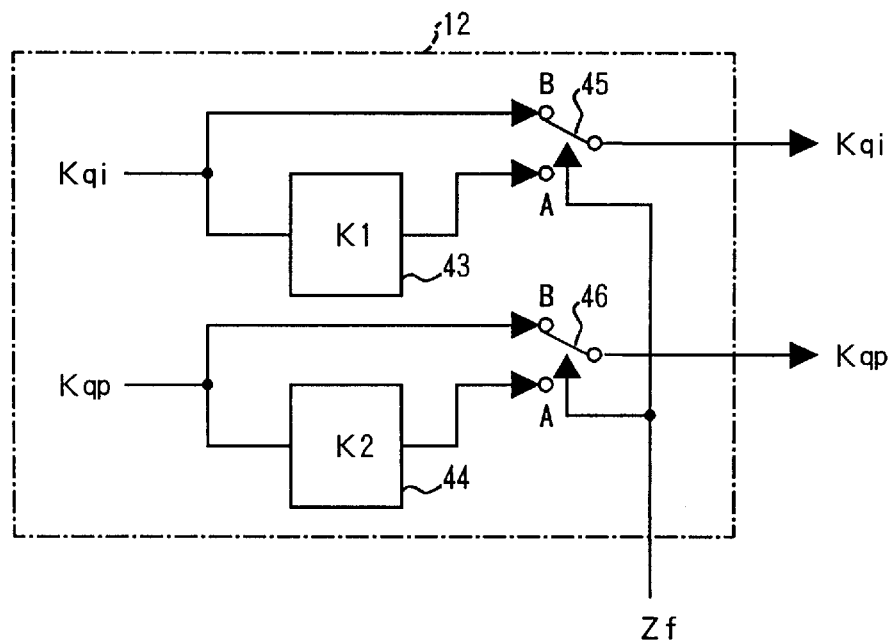
FIG. 6 is a block diagram showing a gain switching section in Embodiment 1 according to the present invention.

The gain switching section 12 comprises, as shown in FIG. 6, a coefficient multiplier 43 for a gain K1 for proportionally reducing a q-axis integral gain Kqi; a coefficient multiplier 44 for a gain K2 for proportionally reducing a q-axis proportional gain Kqp; and switches 45 and 46 for switching depending on a determination signal Zf. The switches 45 and 46 select a contact point A in a case where the determination signal Zf is "0", and select a contact point B in a case where the determination signal Zf is "1".

With this mechanism, the q-axis proportional gain Kqp and the q-axis integral gain Kqi are outputted as they are without proportional reduction thereof in a case where the electric motor 1 is in an operation-instructed state, and are proportionally reduced in a case where the electric motor 1 is in a stop-instructed state.

Figure 7:
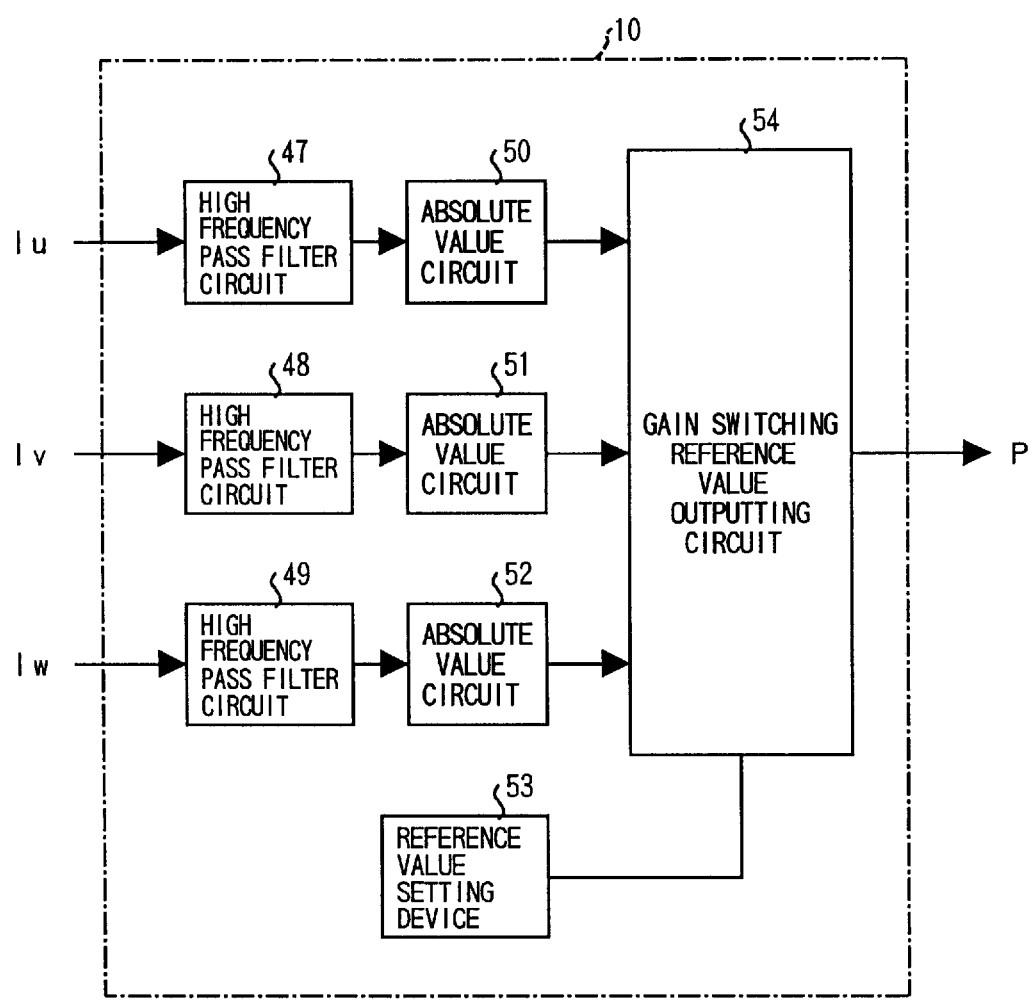
FIG. 7 is a block diagram showing a switching reference value setting circuit in Embodiment 1 according to the present invention.
Figure 8A:
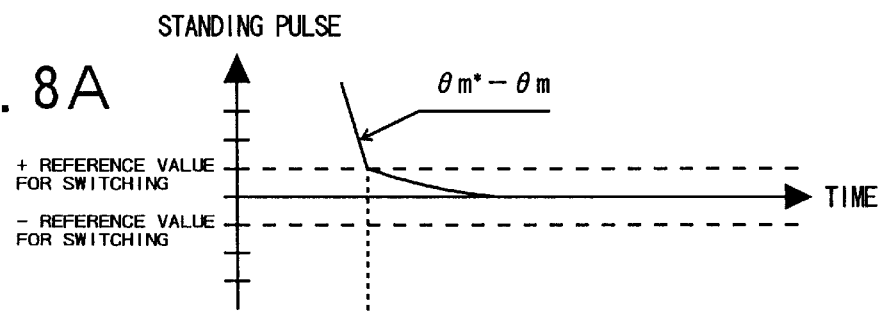
FIG. 8A to FIG. 8D are graphs each showing output from the determining circuit and output from the gain switching section respectively when a positional deviation is in a range of set value for gain switching.
Figure 8B:
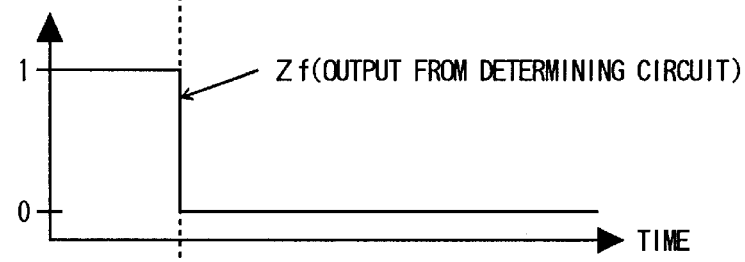
Figure 8C:
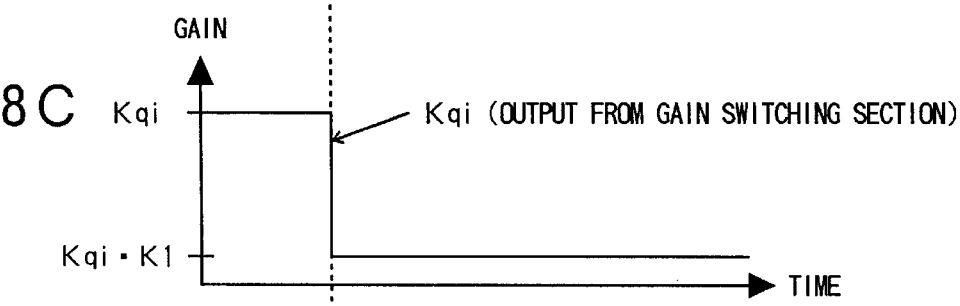
Figure 8D:
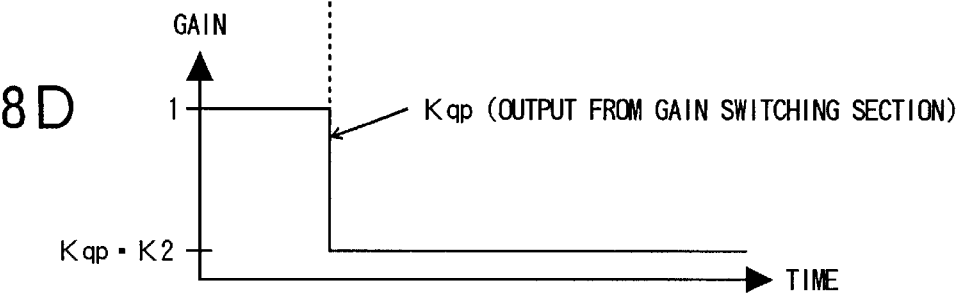

The switching reference value setting circuit 10 comprises, as shown in FIG. 7, a high frequency pass filter circuit 47 for passing a signal higher than a desired frequency of a U-phase current Iu; a high frequency pass filter circuit 48 for passing a signal higher than a desired frequency of a V-phase current Iv; a high frequency pass filter circuit 49 for passing a signal higher than a desired frequency of a W-phase current Iw; absolute value circuits 50, 51, and 52 each for outputting an absolute value of an output value each from the high frequency pass filter circuits 47, 48, and 49; a reference value setting device 53 for setting a reference value for comparison; and a gain switching reference value outputting circuit 54 for outputting a reference value P for gain switching according to an output from each of the absolute value circuits 50 to 52 and a reference value for comparison set by the reference value setting device 53.

To take out a noise factor from the current detectors 13a to 13c, when a system is initialized, a U-phase current Iu, a V-phase current Iv, and a W-phase current Iw are inputted into the high frequency pass filter circuits 47 to 49 respectively in a state where the current control circuit 8 is not working. An absolute value of an output each from the high frequency pass filter circuits 47 to 49, namely a noise factor is inputted into the gain switching reference value outputting circuit 54, and in the gain switching reference value outputting circuit 54, a maximum value of an output value each from the absolute value circuits 50 to 52 is compared to a reference value for comparison set by the reference value setting device 53, and if the maximum value of the noise factor becomes greater than the reference value for comparison, a value of the reference value P for gain switching is made greater, and a value thereof is made smaller if the maximum value of the noise factor becomes smaller than the reference value for comparison.

With this mechanism, a reference value P for gain switching is set to an appropriate value to determine whether it is in a stop-instructed state or in an operation-instructed state according to a noise factor when a phase current is detected.

FIG. 8A to FIG. 8D show a change of a positional deviation ($\theta$m*−$\theta$m), a determination signal Zf, and a q-axis integral gain Kqi as well as a q-axis proportional gain Kqp prior to or after stopping of the electric motor 1.

In a state where the electric motor 1 is stopped, the positional deviation ($\theta$m*−$\theta$m) becomes gradually smaller, and if the value described above becomes smaller than a reference value P for gain switching, a determination signal Zf outputted from the determining circuit 11 is changed from "1" to "0".

When the determination signal Zf has been changed from "1" to "0", the gain switching section 12 switches a q-axis integral gain Kqi to a value obtained by multiplying the normal value by the gain K1, which is outputted, and at the same time switches a q-axis proportional gain Kqp to a value obtained by multiplying the normal value by the gain K2, which is outputted. With this gain switching, response frequency of the current control circuit 8 lowers.

Herein, a case where the electric motor 1 is stopped because both of the positional deviation and the speed deviation are "0", namely, a case where a q-axis current command Iq* is "0" should be considered. Like in the conventional technology, a noise factor having white noise characteristics is included in a current detecting value.

In the present embodiment, however, if the determining circuit 11 determines that the motor is in a stop-instructed state, a q-axis integral gain Kqi as well as a q-axis proportional gain Kqp for the current control circuit 8 lower by gain switching in the gain switching section 12, which makes a response frequency to the current control circuit 8 lower. With this mechanism, the q-axis voltage command signal Vq* of the current control circuit 8 does not include a noise factor of a current detecting value, mechanical resonance is not excited, and the phenomenon of minute vibration is not generated.

In a case where the determining circuit 11 determines that the motor is in an operation-instructed state, a q-axis integral gain Kqi as well as a q-axis proportional gain Kqp for the current control circuit 8 is set to the normal value, so that, in an operation-instructed state, control characteristics required for the step described above is secured.

Figure 9:
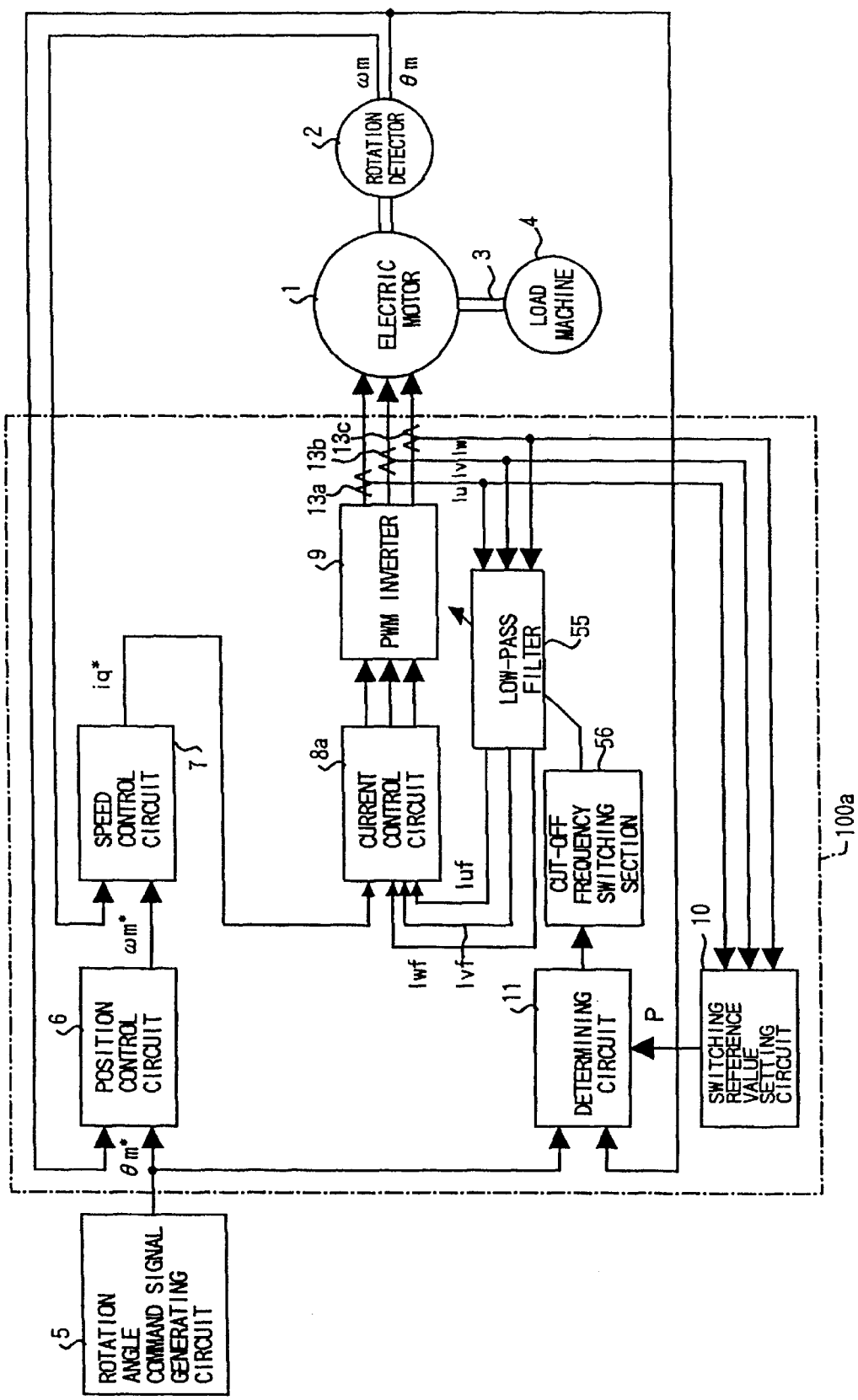
FIG. 9 is a block diagram showing general configuration of Embodiment 2 of the position control unit for an electric motor according to the present invention.

A description is made for Embodiment 2 of a position control unit for an electric motor according to the present invention with reference to FIG. 9 to FIG. 12. FIG. 9 shows general configuration of the position control unit for an electric motor in Embodiment 2. It should be noted that, in FIG. 9, the same reference numerals as those in FIG. 1 are assigned to the portions corresponding to those in FIG. 1, and description thereof is omitted herein.

The position control unit 100a comprises a low-pass filter 55 of a U-phase current Iu, a V-phase current Iv, and a W-phase current Iw each detected by the current detectors 13a to 13c, and a cut-off frequency switching section 56 for switching a cut-off frequency of the low-pass filter 55.

Figure 10:
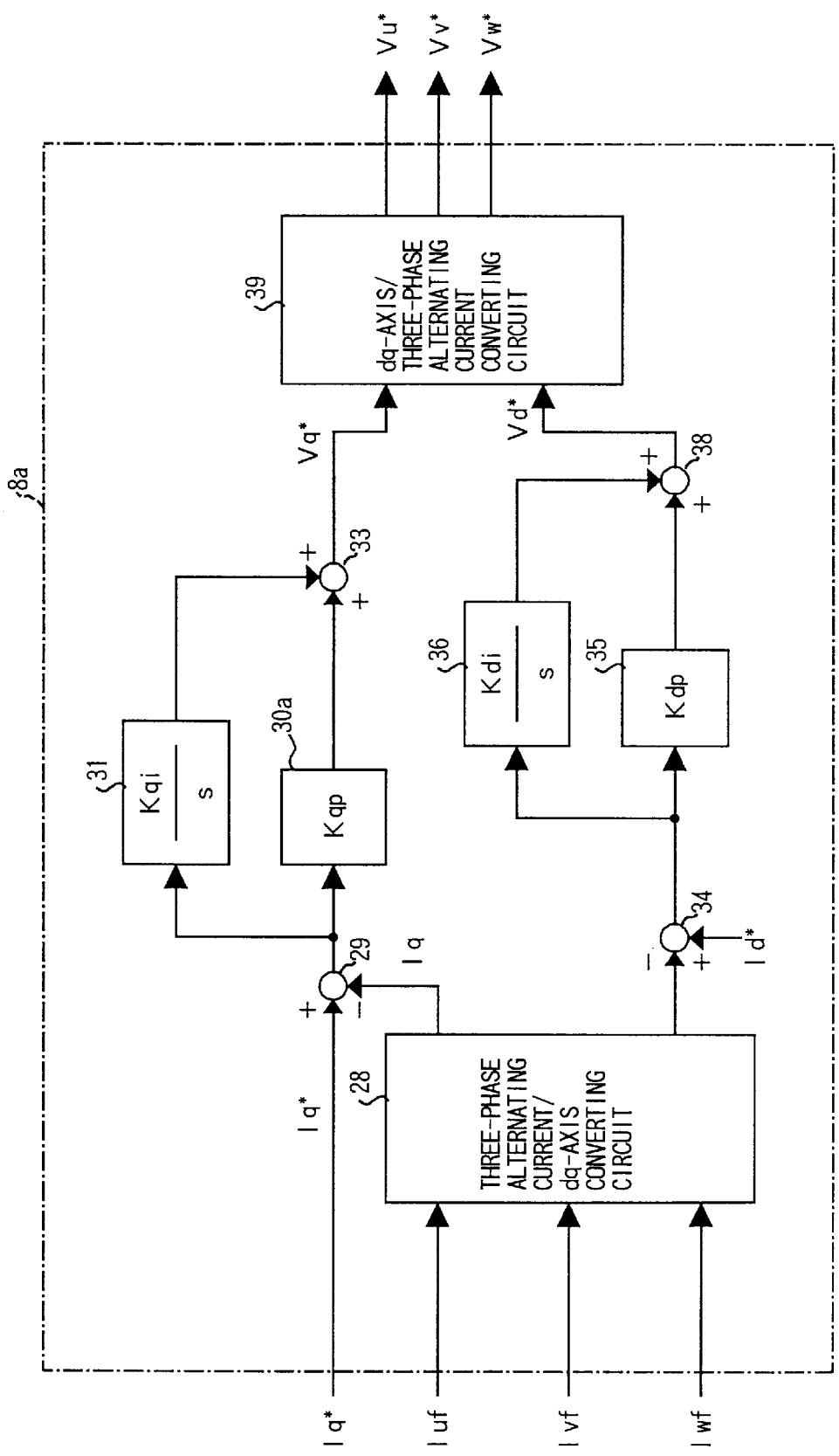
FIG. 10 is a block diagram showing a current control circuit in Embodiment 2 according to the present invention.

A current control circuit 8a in the Embodiment 2 is shown in FIG. 10. It should be noted that, in FIG. 10, the same reference numerals as those in FIG. 4 are assigned to the portions corresponding to those in FIG. 4, and description thereof is omitted herein.

In Embodiment 2, an input signal to the current control circuit 8a is changed from a U-phase current Iu, a V-phase current Iv, and a W-phase current Iw of the electric motor 1 each detected by current detectors 13a to 13c to output Iuf, Ivf, and Iwf from the low-pass filter 55, and a value for a coefficient multiplier 30a for gain Kqp an for proportionally amplifying a deviation (Iq*−Iq) as well as a value for an integrator 31a for amplifying the deviation (Iq*−Iq) by an integral gain Kqi are fixed values respectively.

It should be noted that, in Embodiment 2, the switching reference value setting circuit 10 sets a reference value P for cut-off frequency switching equivalent to the reference value P for gain switching like the reference value for gain switching.

Figure 11:
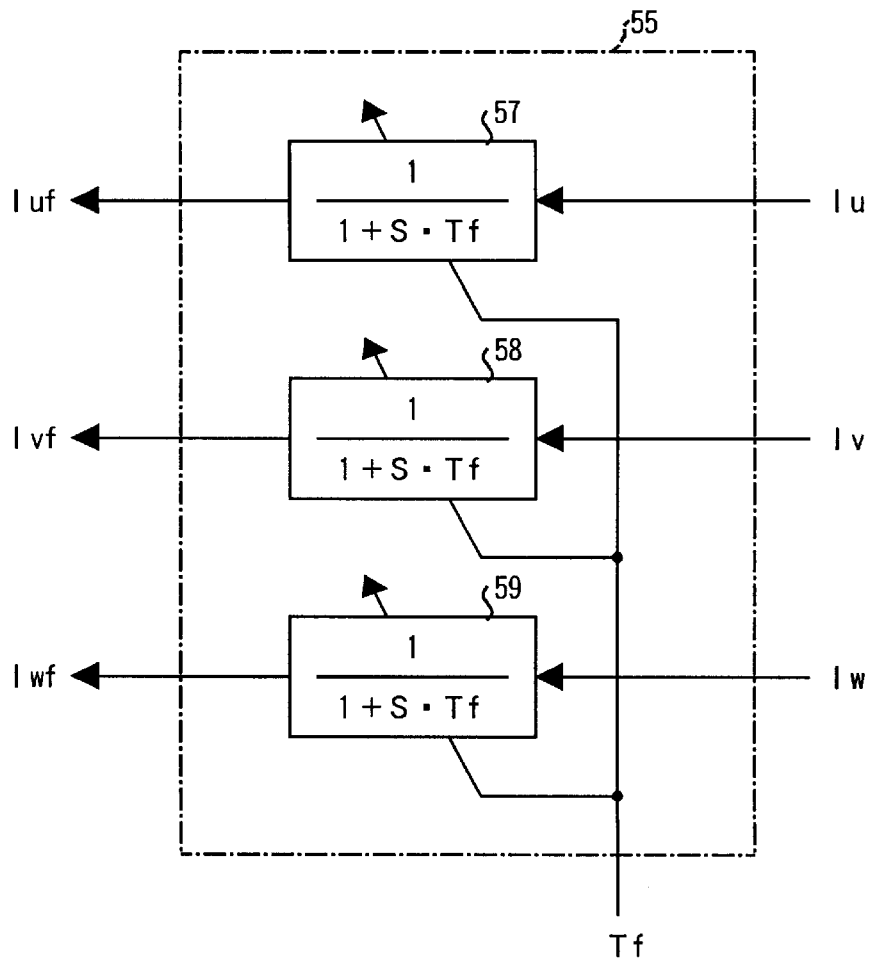
FIG. 11 is a block diagram showing a low pass filter in Embodiment 2 according to the present invention.

The low-pass filter 55 comprises, as shown in FIG. 11, a filter circuit 57 for outputting a U-phase current Iuf cutting a frequency element more than a desired cut-off frequency $\omega$f of the U-phase current Iu for the electric motor 1; a filter circuit 58 for outputting a V-phase current Ivf cutting a frequency element more than a desired cut-off frequency $\omega$f of the V-phase current Iv for the electric motor 1; and a filter circuit 59 for outputting a W-phase current Iwf cutting a frequency element more than a desired cut-off frequency $\omega$f of the W-phase current Iw for the electric motor 1, and a reciprocal of the cut-off frequency, namely a time constant Tf=2$\pi$/$\omega$f is set by a cut-off frequency switching section 56.

Figure 12:
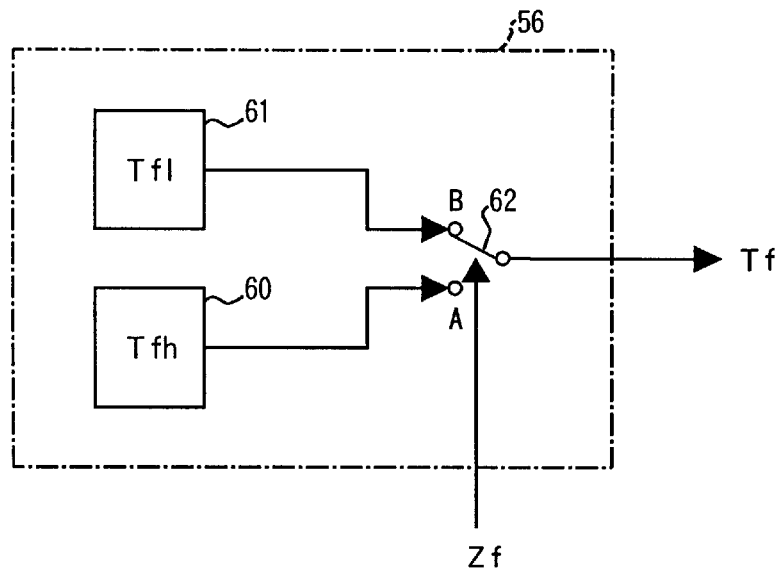
FIG. 12 is a block diagram showing a cut-off frequency switching section in Embodiment 2 according to the present invention.

The cut-off frequency switching section 56 comprises, as shown in FIG. 12, a high frequency cut-off time constant setter 60 for setting a reciprocal of the high-pass cut off frequency ωfh which is comparatively high, namely a time constant Tfh; a low frequency cut-off time constant setter 61 for setting a reciprocal of the low-pass cut off frequency ωfl which is comparatively low, namely a time constant Tfl; and a switch 62 for switching depending on a determination signal Zf.

The switch 62 is switched to the contacting point A in a case where the determination signal Zf is "0", namely in a stop-instructed state, and is switched to the contacting point B in a case where the determination signal Zf is "1", namely in an operation-instructed state.

With this feature, a cut-off frequency ωf each for filter circuits 57 to 60 is switched to a low-pass cut off frequency ωfl in the stop-instructed state, and in contrast to that, a cut-off frequency ωf each for the filter circuits 57 to 60 is switched to a high-pass cut off frequency ωfh in the operation-instructed state.

Herein, a case is assumed where the electric motor 1 are stopped with both a position deviation and a speed deviation at "0", namely a case where a q-axis current command Id* is "0". A noise factor which is white noise characteristics is included in the current detecting value like the conventional example.

In the embodiment, however, if the determining circuit 11 determines that the motor is in a stop-instructed state, a cut off frequency each for the filter circuits 57 to 60 in the low-pass filter 55 is switched to a low-pass cut off frequency ωfl, and a noise factor of a high frequency included in the current detecting value is effectively cut by the low-pass filter 55.

As described above, the U-phase current Iuf, V-phase current Ivf, and W-phase current Iwf in which noise elements of the high frequency are cut are inputted into the current control circuit 8 each as a returning signal, so that the q-axis voltage command signal Vq* for the current control circuit 8 does not include a noise factor in the current detecting value, a mechanical resonance is not excited, and an phenomenon of minute vibration is not generated.

In a case where the determining circuit 11 determines that the motor is in the operation-instructed state, a cut off frequency for each of the filter circuits 57 to 60 in the low-pass filter 55 is switched to a high-pass cut off frequency ωfh, so that, in the operation-instructed state, control characteristics required for this step can be insured.

Figure 13:
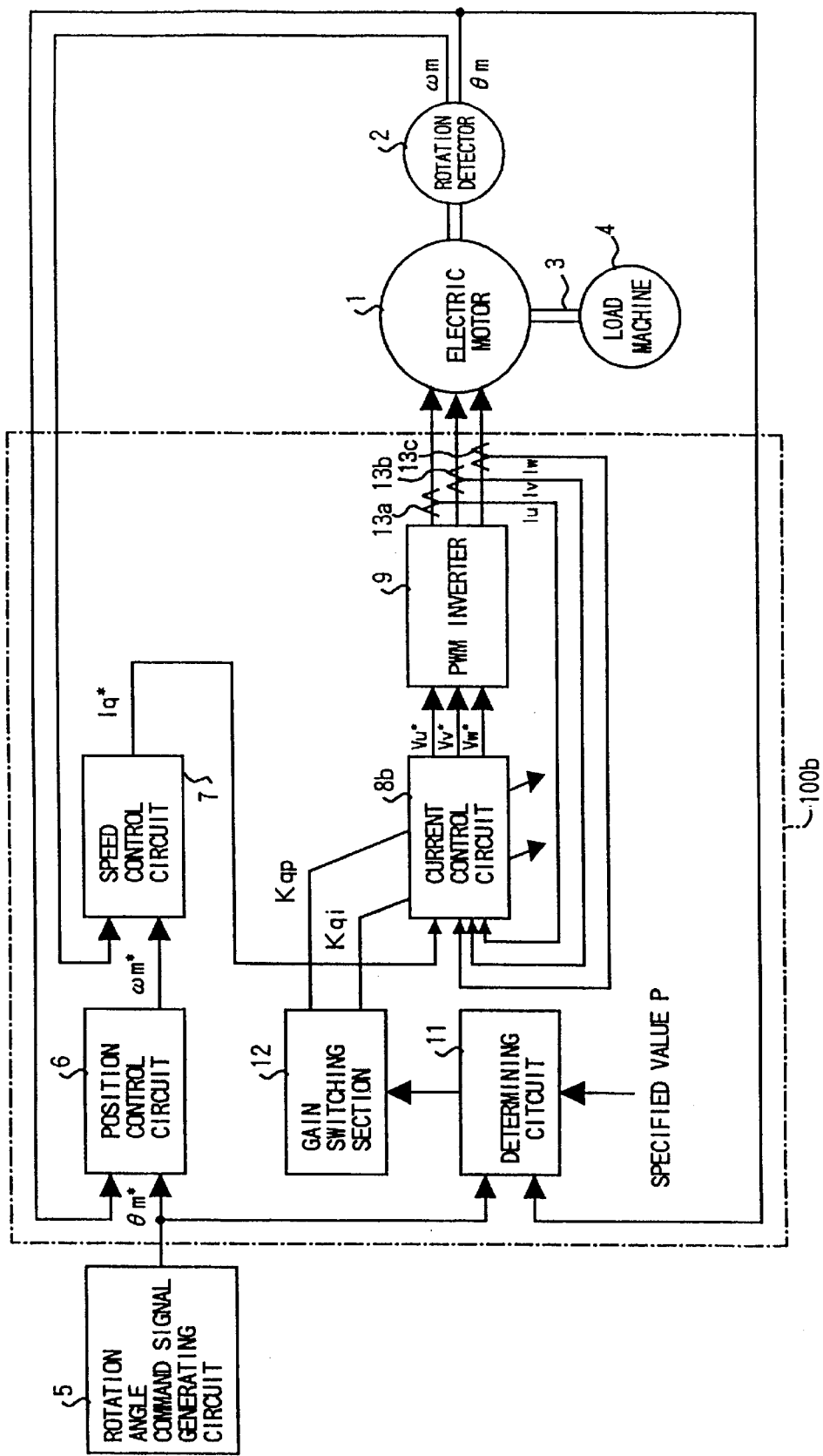
FIG. 13 is a block diagram showing general configuration of Embodiment 3 of the position control unit for an electric motor according to the present invention.
Figure 14:
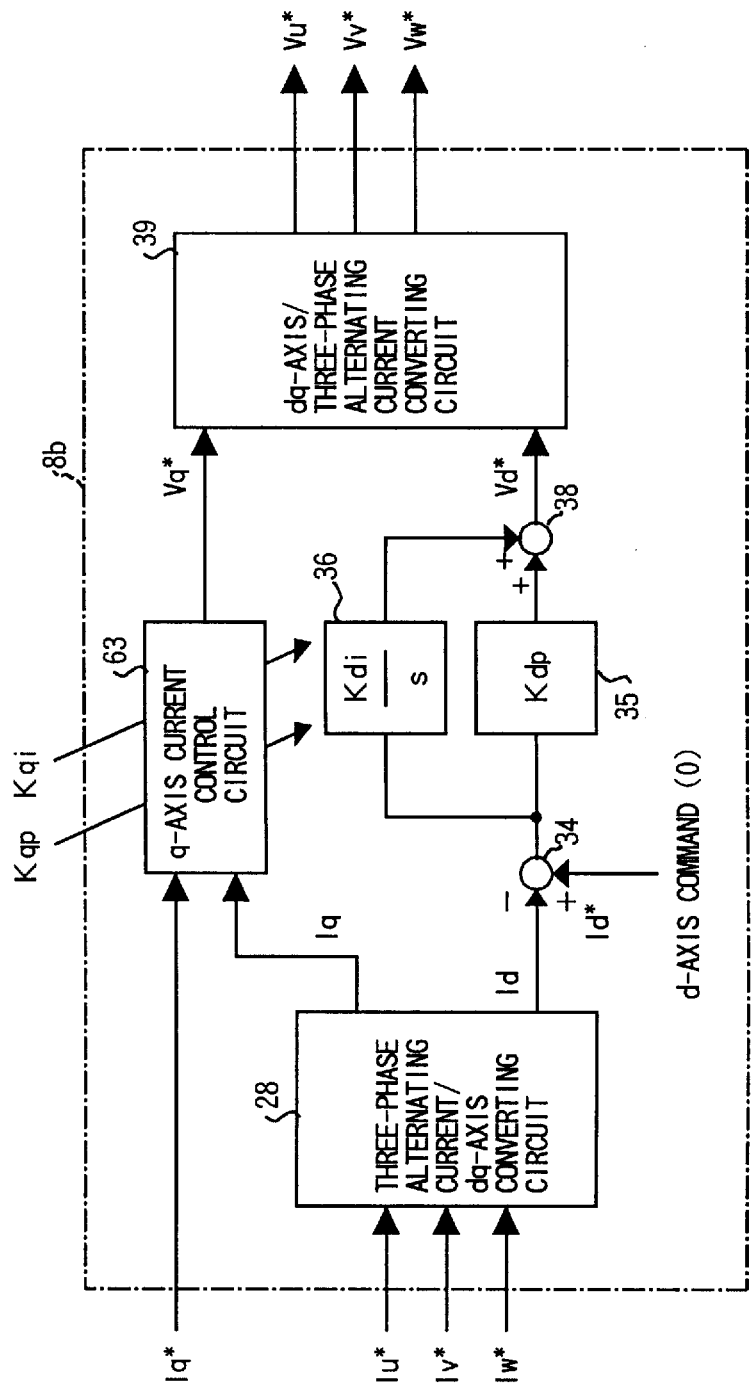
FIG. 14 is a block diagram showing a current control circuit in Embodiment 3 according to the present invention.
Figure 15:
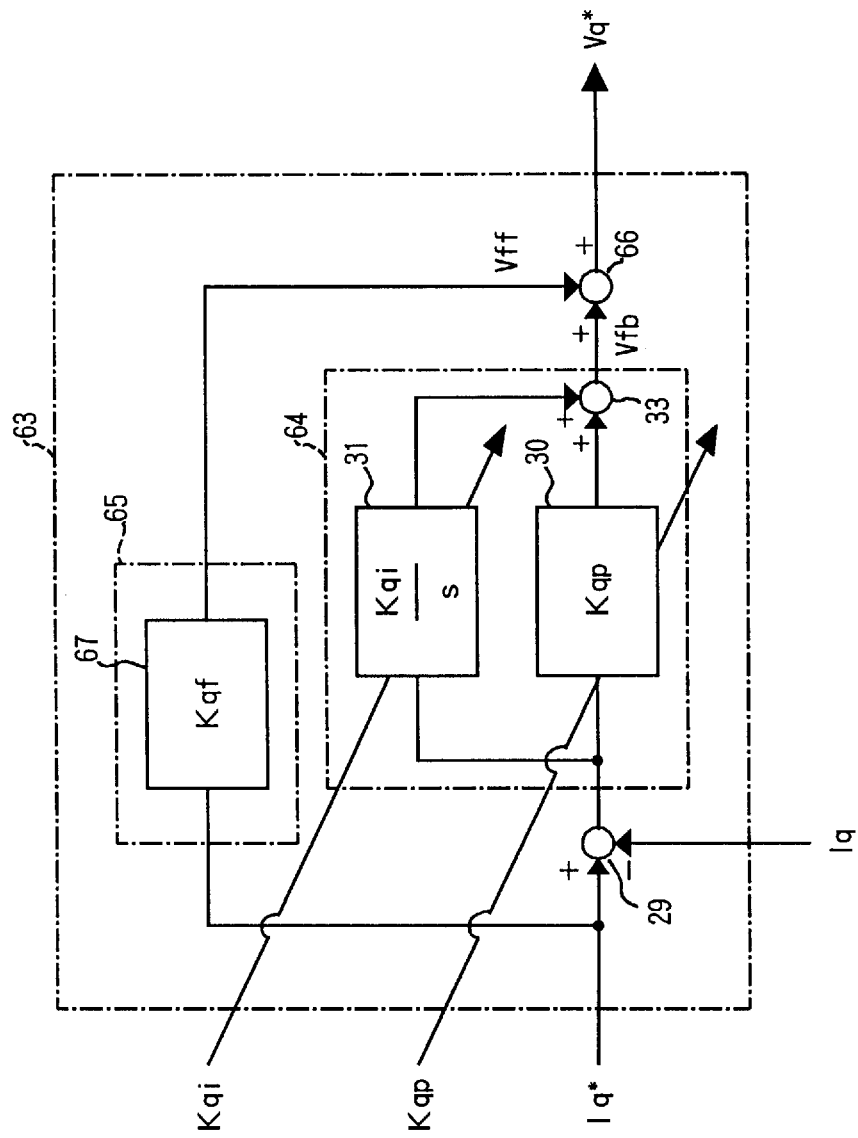
FIG. 15 is a block diagram showing a q-axis current control circuit in Embodiment 3 according to the present invention.

Description is made for Embodiment 3 of the position control unit for an electric motor according to the present invention with reference to FIGS. 13 to 15. FIG. 13 shows the entire configuration of the position control unit for an electric motor in Embodiment 3. It should be noted that, in FIG. 13, the same reference numerals are assigned to the portions corresponding to those in FIG. 1 and description thereof is omitted herein.

FIG. 14 shows a current control circuit 8b in Embodiment 3. It should be noted that, in FIG. 14, the same reference numerals are assigned to the portions corresponding to those in FIG. 4 and description thereof is omitted herein.

In the current control circuit 8, a q-axis current control circuit 63 for controlling a torque equivalent current includes, as shown in FIG. 15, a first current compensating circuit 64 for compensating for feed back, a second current compensating circuit 65 for compensating for feed forward, and an adder 66 for summing up an output from the first current compensating circuit 64 and an output from the second current compensating circuit 65.

The first current compensating circuit 64 comprises, like a case in Embodiment 1, a coefficient multiplier 30 for amplifying a deviation (Id*−Id) with a proportional gain Kdp, an integrator 31 for amplifying the deviation (Id*−Id) with the integral gain Kdi, and an adder 33 for summing up an output from the coefficient multiplier 30 and an output from the integrator 31, and outputs a first q-axis voltage command Vfb so that a q-axis current value has desired response characteristics.

A proportional gain Kdp of the coefficient multiplier 30 and an integral gain Kdi of the integrator 31, like a case in Embodiment 1, are set to switch by the gain switching section 12. Namely, in a case where a value of a positional deviation (θm*−θm) is smaller than a gain switching reference value P, the proportional gain Kdp and the integral gain Kdi are switched to lower value, and otherwise the proportional gain Kdp and the integral gain Kdi are switched to higher ones.

The second current compensating circuit 65 has a coefficient multiplier 67 of a gain Kqf for compensating for feed forward, receives a q-axis current command Iq* and outputs a second voltage command Vff.

The second current compensating circuit 65 couples a q-axis current command Iq* to a q-axis voltage command in the feed forward mode, so that the current command signal Iq* is possible to directly reflect to the q-axis voltage command.

Next, a description is made for effect in a case where the second current compensating circuit 65 is added.

If a case that a transfer function of an electric motor 1 is regarded as a transfer function up to a q-axis current value Iq to a q-axis voltage command Vq * is simulated, a simulated transfer function of an electric motor Gm can be shown by the following expression: Gm=1/(Ls+R). A factor of the current for the q-axis is a torque, and a torque is not generated from a d-axis current command, so that a problem on a minute vibration is not affected by a d-axis. Accordingly, description of the d-axis is omitted hereinafter.

At first, description is made for a case where the second current compensating circuit 65 is not included. If a transfer function from a q-axis current command signal Iq * to a first axis detected current value Iq is computed by using the simulated transfer function Gm, this transfer function Gi is shown by the below expression (1):

$$Gi = \frac{Kqps + Kqi}{Ls^2(R + Kqp)s + Kqi} \tag{1}$$

This transfer function Gi is equivalent to a current target value response characteristics of the current control circuit section or a noise response characteristics, so that, if the gain Kqp and Kqi are lowered at a specified proportion in, for instance, a vibration suppressed area (in a stop-instructed state), the noise response characteristics are improved, and because a high frequency factor in the noise factor included in the q-axis current value is cut off, a high frequency minute vibration can be suppressed.

However, if the gain Kqp and Kqi are lowered, the target value response characteristics also become lower, for instance, in ultrafast positioning, a high frequency factor can be included in a current command value at the instant of inrushing of the motor into the area of suppressing a vibration, and at this instant the current control circuit can not follow the command in high frequency due to deterioration of the target value response characteristics, whereby the motor can again go out of the vibration suppressed area.

Next description is made for a case where the second current compensating circuit 65 is included. When the second current compensating circuit 65 is realized with the coefficient multiplier 67 which is the most simple configuration, if a transfer function from the q-axis current command Iq * to the q-axis current value Iq is computed by using the simulated transfer function Gm, this transfer function Gif is shown by the following expression (2).

$$Gif = \frac{\frac{R}{Ls+R} + \frac{Kqp}{Ls}}{1 + \frac{Kqp}{Ls}} \quad (2)$$

This transfer function Gif is equivalent to the current target value response characteristics in the current control circuit section, and because the noise response characteristics is kept functioning according to the expression (1), each of a target value response characteristics and a noise response characteristics is possible to be set respectively. Accordingly, even in a case where a noise for a high frequency factor is cut by lowering the gain Kqp and Kqi by a certain proportion in the vibration suppressed area, the current target response characteristics Gif can raise the gain in a frequency lower than that in the reciprocal of the motor time constant: Ts=L/R by adjusting the coefficient multiplier 67 for the gain Kqf.

Figure 16:
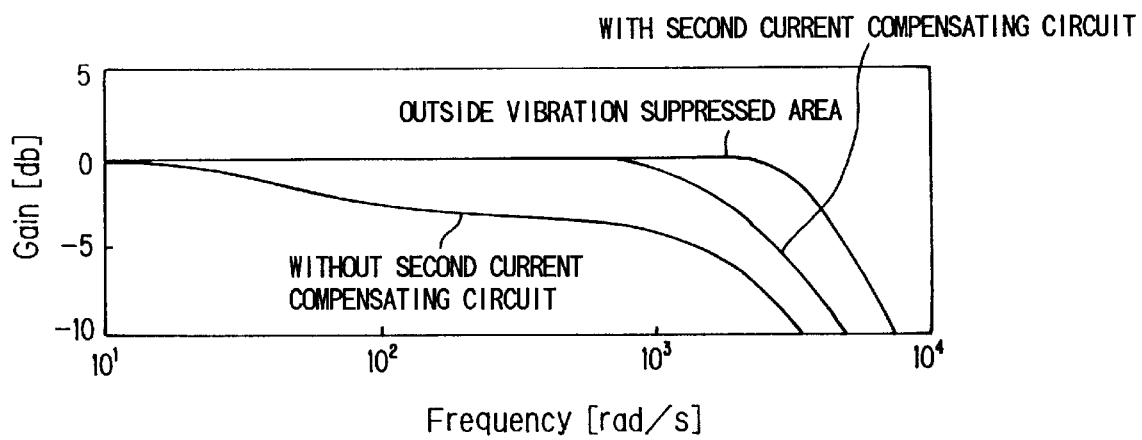
FIG. 16 is a graph showing target current response characteristics.
Figure 17:
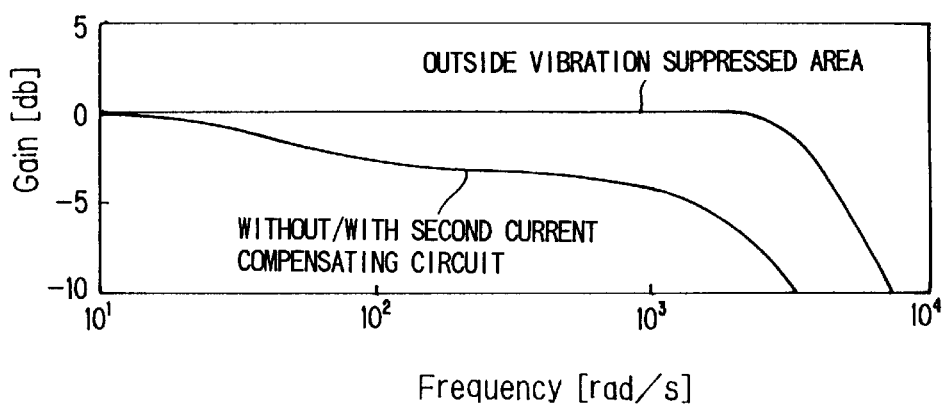
FIG. 17 is a graph showing noise response characteristics.

For instance, FIG. 16 and FIG. 17 show a target value response characteristics and a noise response characteristics when the gain Kqp and Kqi are lowered each by ½ and ¹⁄₁₆ in the vibration suppressed area assuming that a response band of the current control circuit 8 is set to 3,000 rad/s.

It is understood from FIGS. 16 and 17 that, in a case where the second current compensating circuit 65 is not included, both of the target value response characteristics and noise response characteristics become lower if each gain is switched in the vibration suppressed area. Namely, the case described above indicates that the effect to the noise more than 100 rad/s becomes smaller, and an output to a target value also becomes smaller although a minute vibration in a frequency more than the frequency decreases.

In contrast, in a case where the second current compensating circuit 65 is included, the noise response characteristics also become lower, but the target response characteristics are substantially improved.

If the second current compensating circuit 65 is realized with the coefficient multiplier 67 based on the system in Embodiment 3 according to FIG. 16, a response band for the current control circuit 8 can be kept up to about 1,000 rad/s even in the vibration suppressed area.

It should be noted that, it is easily possible to be realized that target value response characteristics before and after switching the gain are the same characteristics by changing the integrator in the second current compensating circuit 65 to one at higher level.

In the embodiment as described above, a change of the transfer function Gi from a q-axis current command Iq* to a q-axis detected current value Iq before and after switching values for the gain Kqp and kqi according to switching gain output from the gain switching section, namely a change of a target value response characteristics Gi in the current control circuit section can freely be made smaller. Accordingly, gain switching can be executed without generating a vibration caused by gain switching, and at the same time a vibration caused by noise can be suppressed in the vibration suppressing mode.

Description is made for Embodiment 4 of the position control unit for an electric motor according to the present invention with reference to FIGS. 18 to 21. It should be noted that, in FIGS. 18 to 20, the same reference numerals are assigned to the portions corresponding to those in FIGS. 13 to 15 and description thereof is omitted herein, and in FIG. 21, the same reference numerals are assigned to the positions corresponding to those in FIG. 6 and description thereof is omitted herein.

In the embodiment, a gain Kqf for a coefficient multiplier 67b in a second current compensating circuit 65b in addition to gain switching of the proportional gain Kqp and integral gain Kqi in the first current compensating circuit 64 is also set to switch according to whether a positional deviation (θm*−θm) is smaller or larger than a gain switching reference value P.

A gain switching section 12b comprises, as shown in FIG. 21, a coefficient multiplier 43 for a gain K1 for proportionally reducing a q-axis integral gain Kqi; a coefficient multiplier 44 for a gain K2 for proportionally reducing a q-axis proportional gain Kqp; a coefficient multiplier 68 for a gain K3 for proportionally reducing a gain Kqf in addition to the switches 45 and 46 for switching according to a determination signal Zf; and a switch 69 for switching according to a determination signal Zf. The switches 45, 46, and 69 each are switched to the contacting point A if a value of the determination signal Zf is "0" (a vibration suppressed area), and to the contacting point B if a value thereof is "1".

If the determining circuit 11 determines that a deviation between a positional command signal and an actual position signal is within the vibration suppressed area, the gain switching section 12b outputs three types of signal such as switching gain Kqp, Kqi, and Kqf respectively. The gain for the three units of coefficient multiplier such as the coefficient multiplier 30, integrator 31, and coefficient multiplier 67b is switched simultaneously according to a signal from the gain switching section 12b.

In the embodiment, when gain switching, a gain Kqf in the second current compensating circuit 65b is also switched, so that each of the current target value response characteristics Gif before or after gain switching can be set independently. With this feature gain switching can be executed without generating the vibration caused by gain switching, and at the same time the vibration caused by noise can be suppressed in the vibration suppressing mode.

Figure 18:
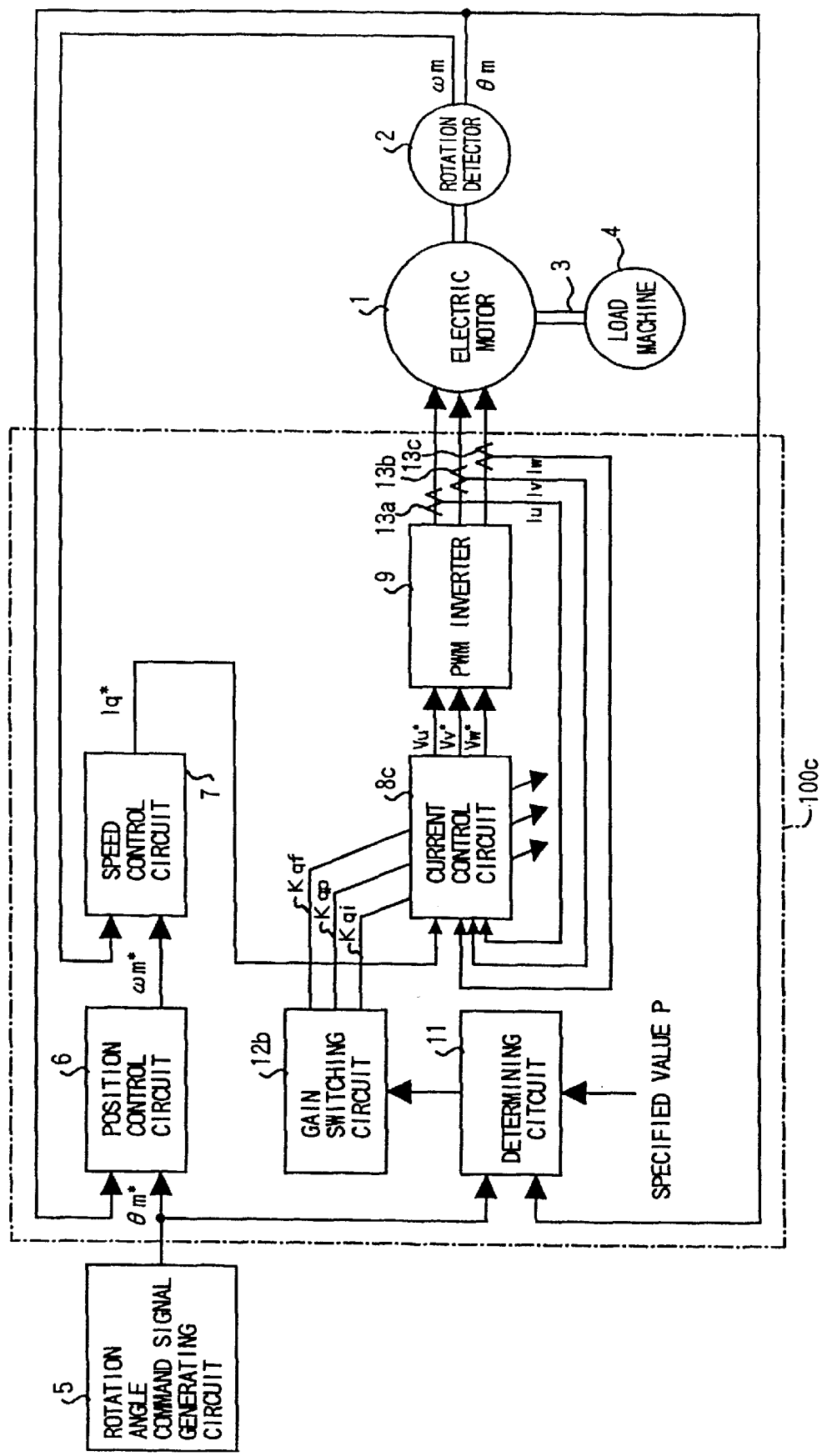
FIG. 18 is a block diagram showing general configuration of Embodiment 4 of the position control unit for an electric motor according to the present invention.
Figure 19:
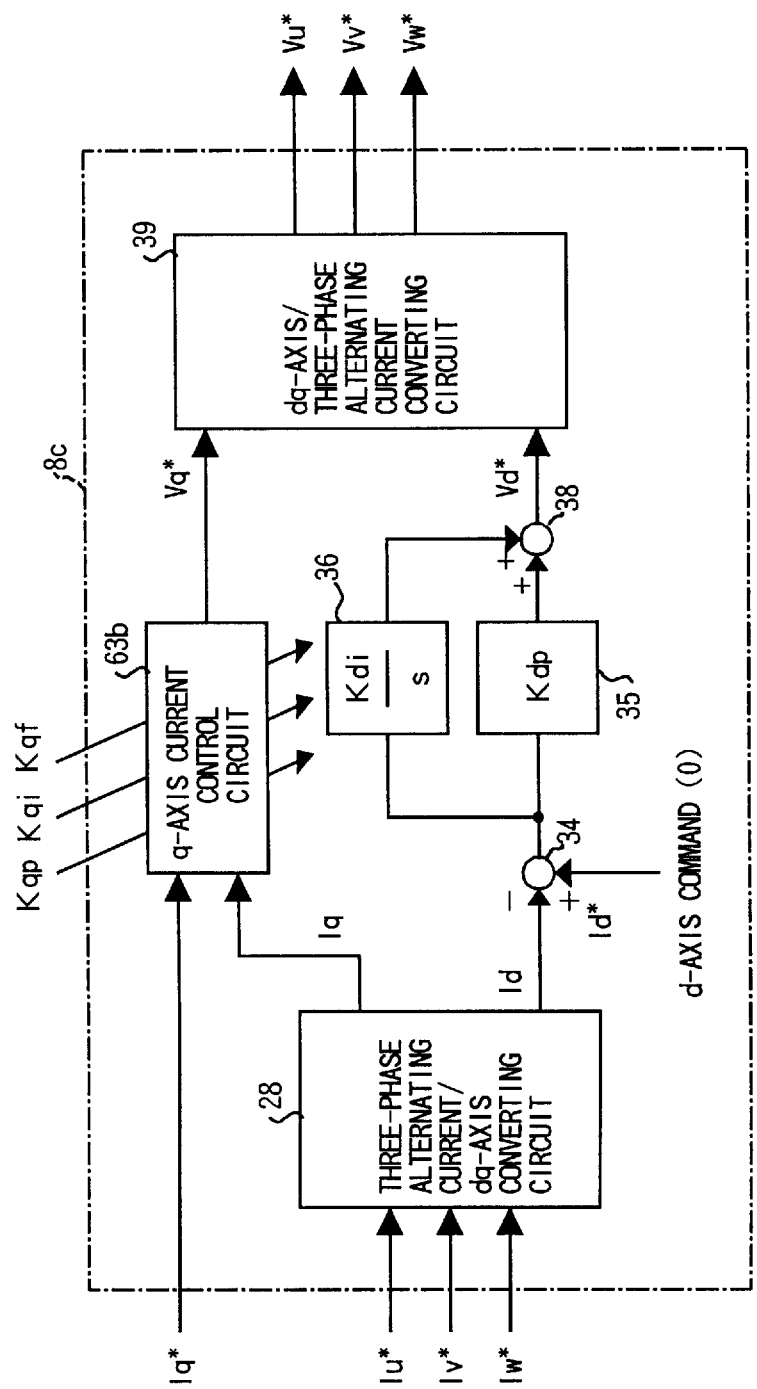
FIG. 19 is a block diagram showing a current control circuit in Embodiment 4 according to the present invention.
Figure 20:
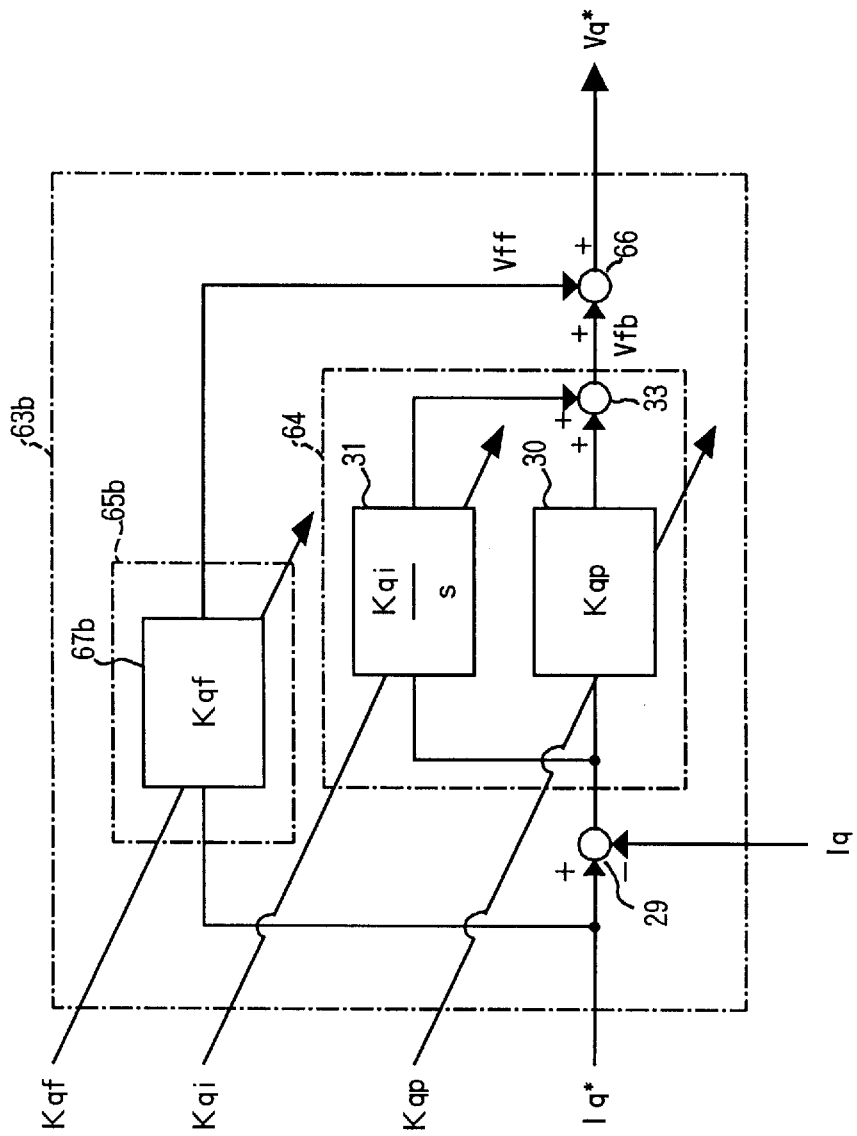
FIG. 20 is a block diagram showing a q-axis current control circuit in Embodiment 4 according to the present invention.
Figure 22:
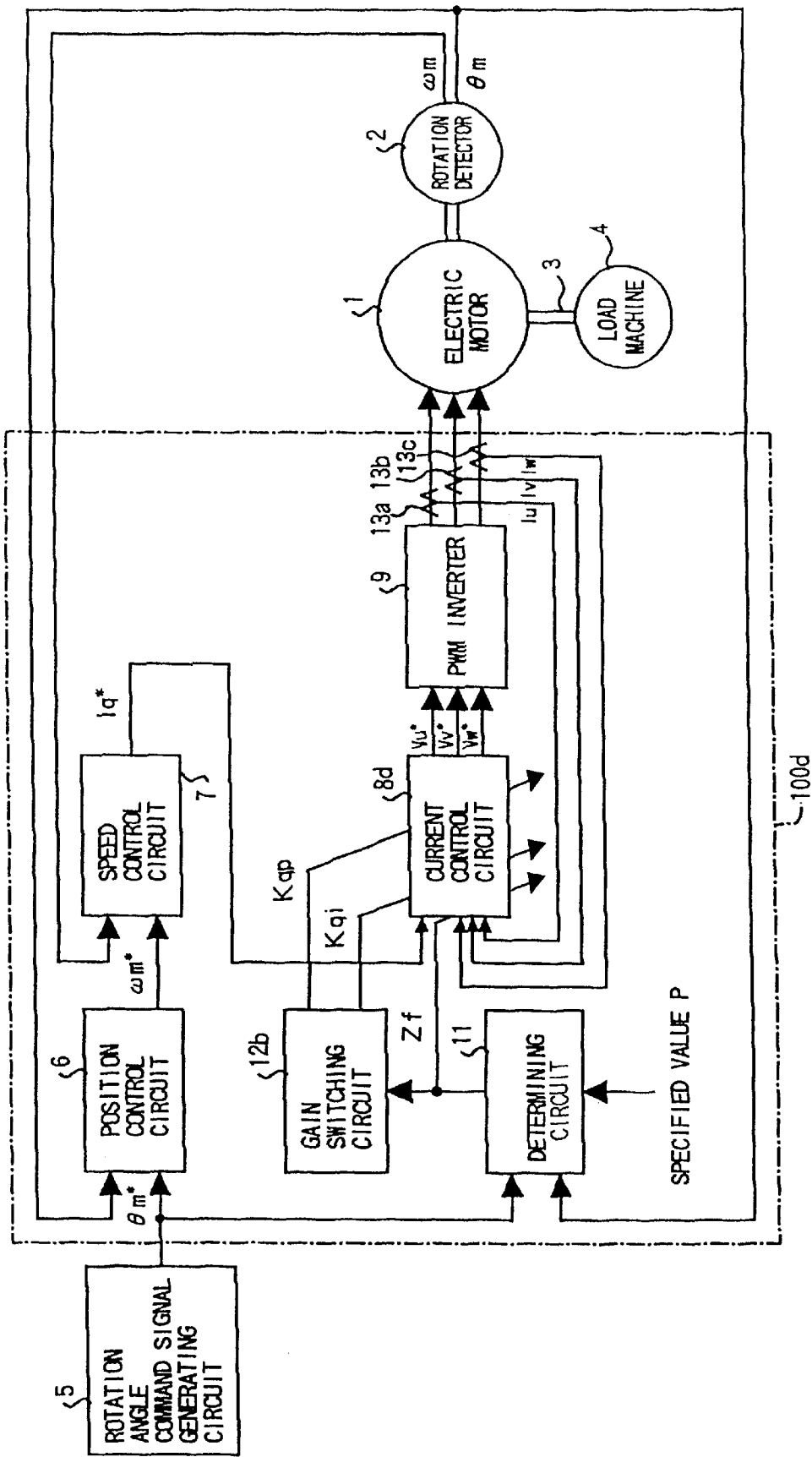
FIG. 22 is a block diagram showing general configuration of Embodiment 5 of the position control unit for an electric motor according to the present invention.
Figure 23:
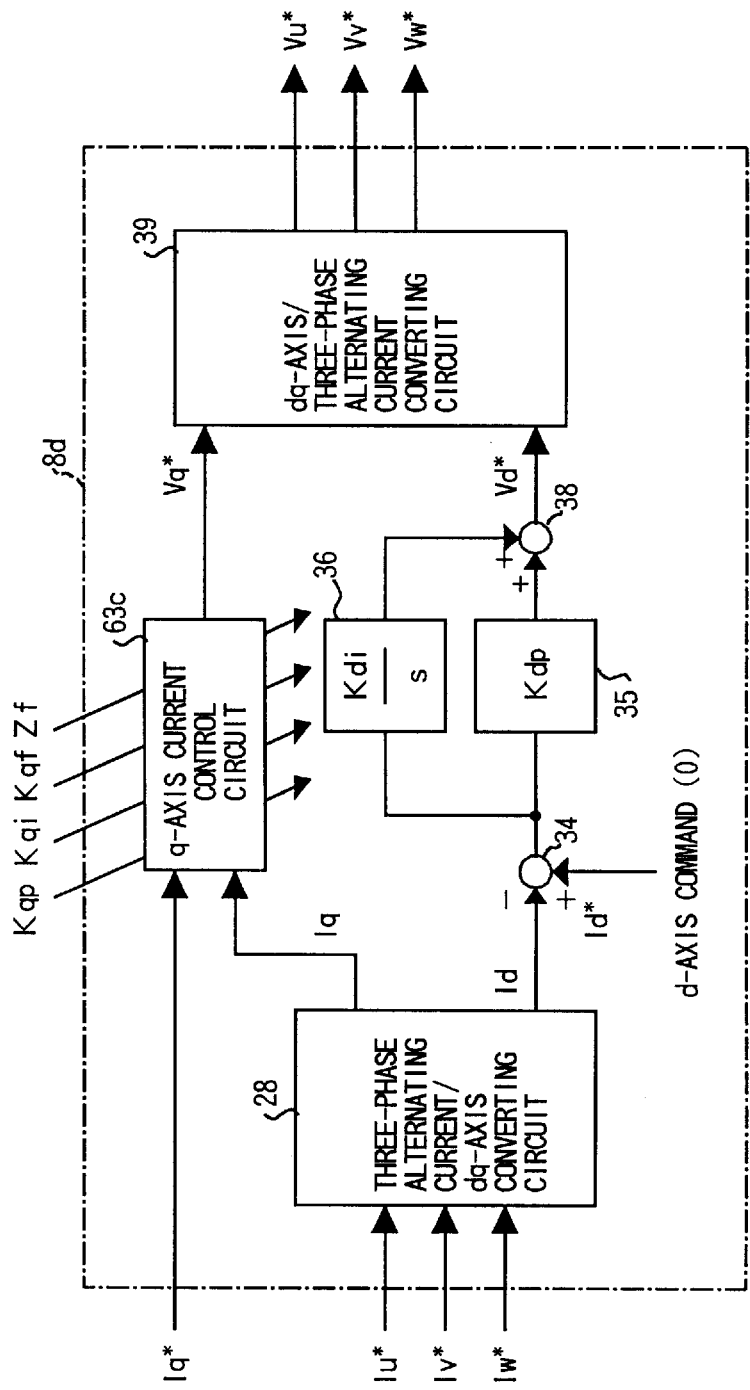
FIG. 23 is a block diagram showing a current control circuit in Embodiment 5 according to the present invention.
Figure 24:
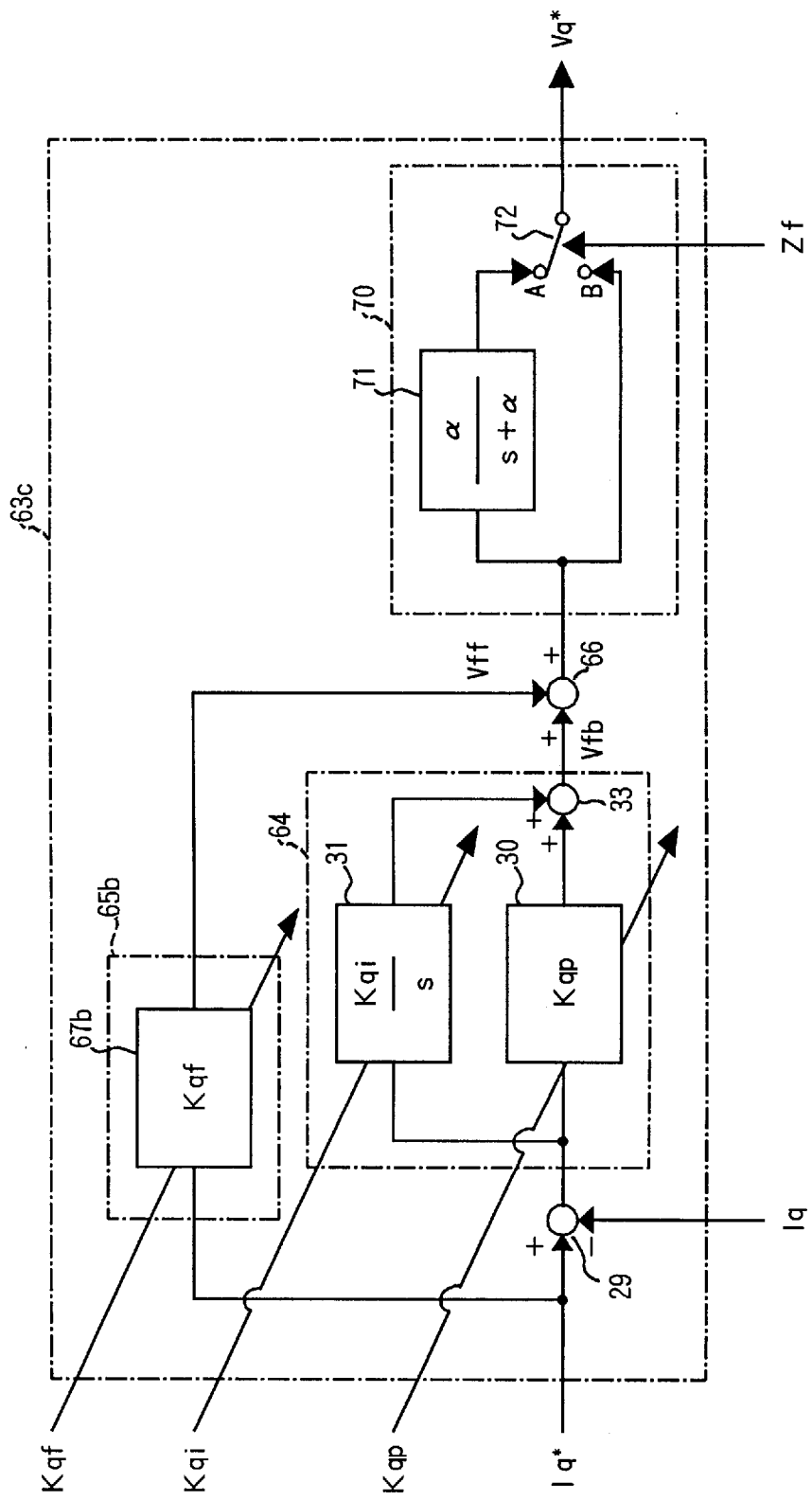
FIG. 24 is a block diagram showing a q-axis current control circuit in Embodiment 5 according to the present invention.
Figure 25:
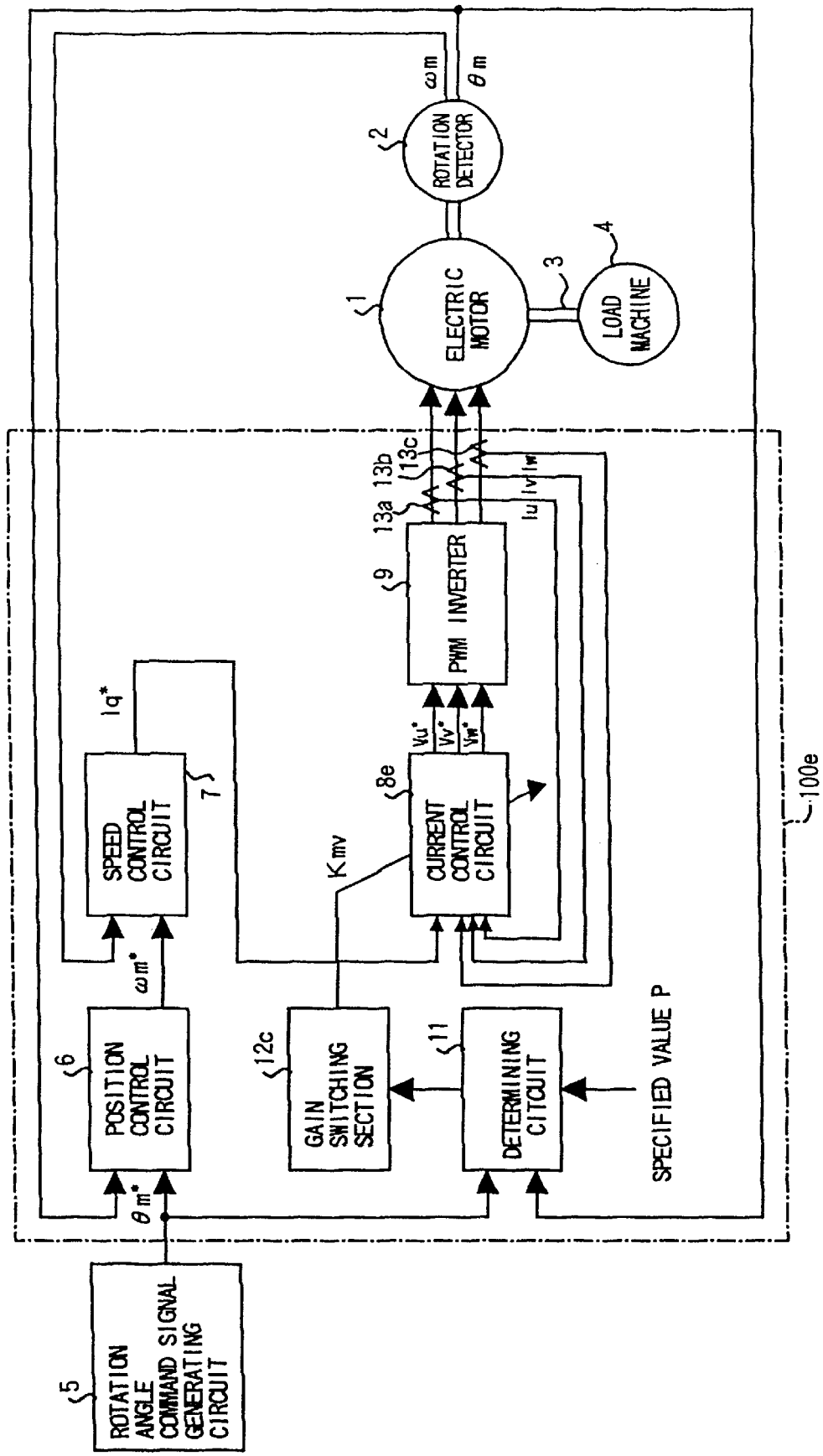
FIG. 25 is a block diagram showing general configuration of Embodiment 6 of the position control unit for an electric motor according to the present invention.
Figure 26:
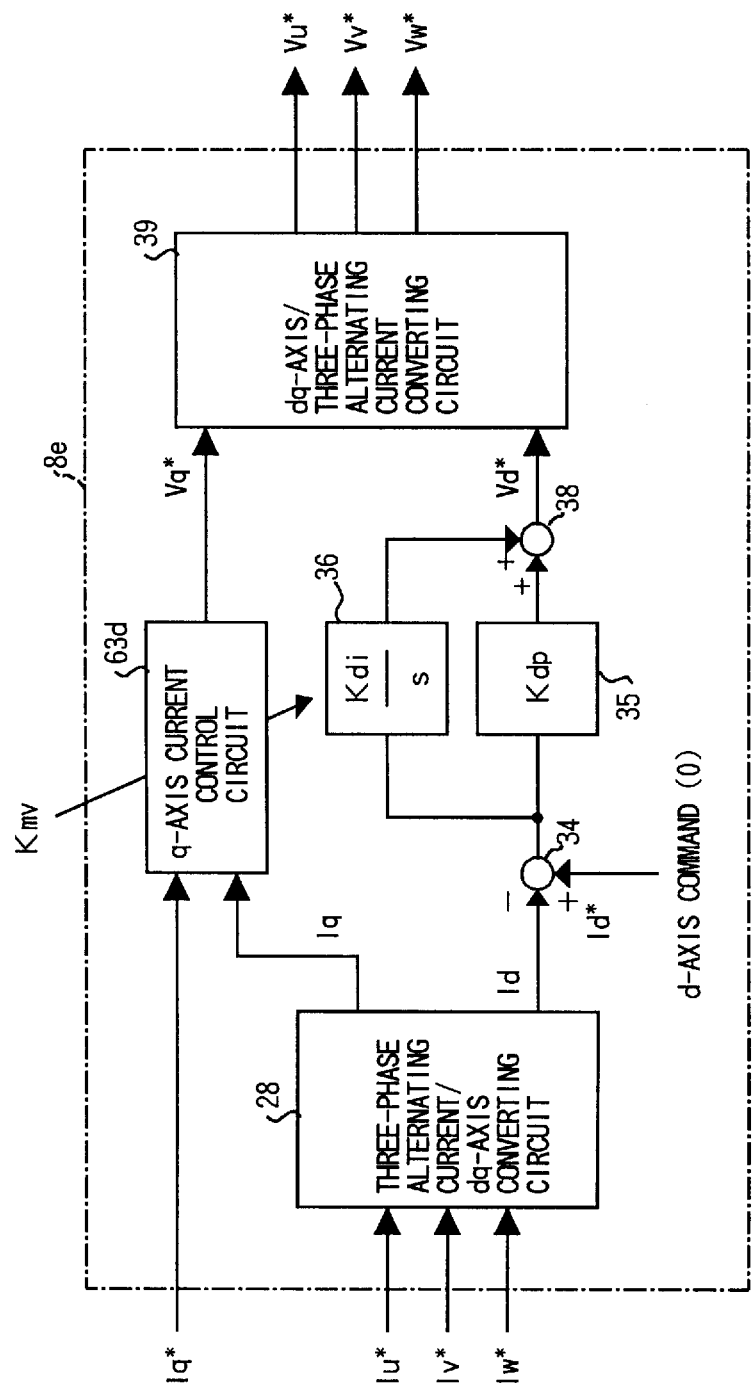
FIG. 26 is a block diagram showing a current control circuit in Embodiment 6 according to the present invention.

Next, a description is made for Embodiment 5 of the position control unit for an electric motor according to the present invention is made with reference to FIG. 22 to FIG. 24. It should be noted that, in FIG. 22 to FIG. 24, the same reference numerals as those used in FIG. 18 to FIG. 20 are assigned to sections corresponding to those in FIG. 18 to FIG. 20, and description thereof is omitted herein.

In this embodiment, the q-axis current control section 63c has, in addition to the first current compensating circuit 64 and the second current compensating circuit 65b, which are equivalent to those in Embodiment 4, a third current compensating circuit 70.

The third current compensating circuit 70 receives a value obtained by summing up a first q-axis voltage command Vfb and a second q-axis voltage command Vfb and outputs a q-axis voltage command Vq*, and comprises a primary delay circuit 71 having a primary delay time constant α and a select switch 72 which can be switched according to an external signal.

The select switch 72 executes the switching operation according to a determination signal Zf from the determining circuit 11, and selects contact point A in a case where the determination signal Zf is "0", namely in the stop-instructed state, and selects contact B in a case where the determination signal Zf is "1", namely in the operation-instructed state.

With this feature, in the stop-instructed state, in other words, when a select signal "0" for the vibration suppressing mode is received, the select switch 72 is switched to the side of the primary delay circuit 71, and in contrast when a select signal "1" for vibration not suppressing mode is received, the select switch 70 is switched to the direct output side. It should be noted that, when the select switch 72 is switched to the direct output side, the integration capacity of the primary delay circuit 70 is initialized.

In this embodiment, the current target value response characteristics Gi before and after gain switching can discretely be set, and in addition it is possible to make the q-axis voltage command signal Vq* smoothly change by switching the select switch 72 in gain switching to the vibration suppressing mode to shift to the primary delay circuit 71.

Next, a description is made for Embodiment 6 of the position control unit for an electric motor according to the present invention with reference to FIG. 25 to FIG. 28. It should be noted that, in FIG. 25 to FIG. 27, the same reference numerals as those used in FIG. 13 to FIG. 15 are assigned to sections corresponding to those in FIG. 13 to FIG. 15, and description thereof is omitted herein.

Figure 27:
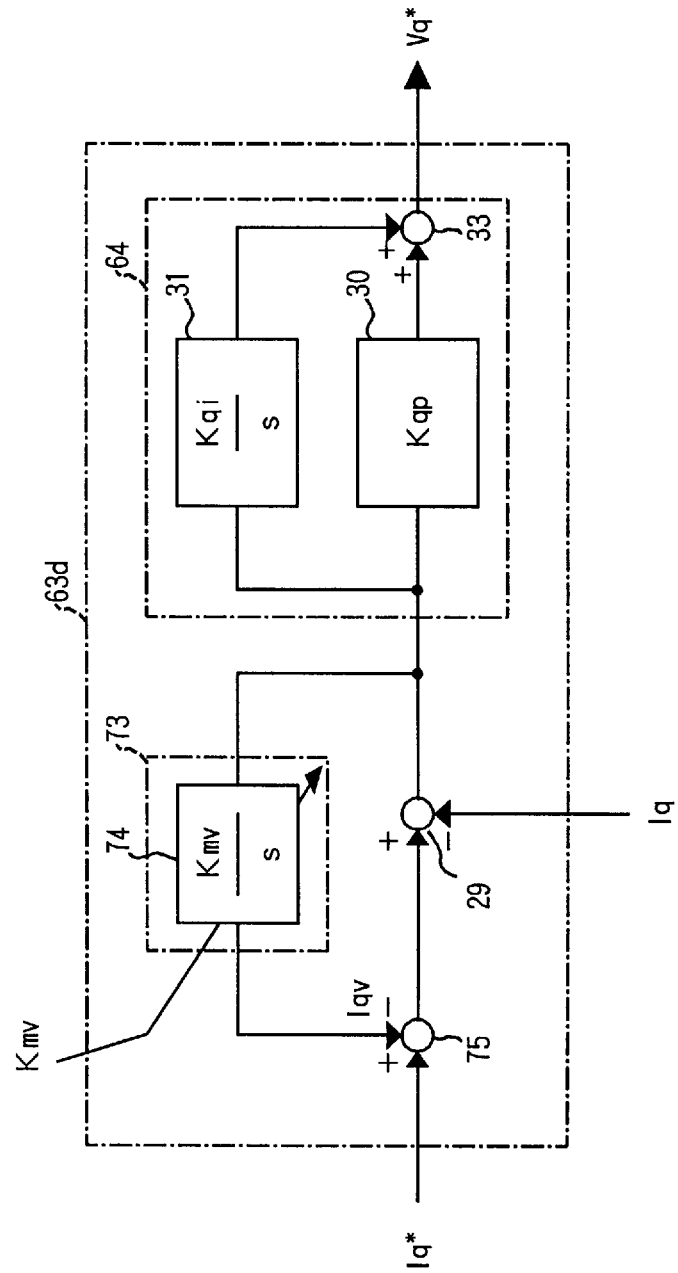
FIG. 27 is a block diagram showing a q-axis current control circuit in Embodiment 6 according to the present invention.

In this embodiment, as shown in FIG. 27, the q-axis current control circuit 63d has, in addition to the first current compensating circuit 64, a first vibration suppressing circuit 73.

The q-axis current control circuit 63d includes, like in each of the embodiments described above, an integrator 31 which amplifies a deviation (Iq*−Iq) with a integral gain Kqi and a coefficient multiplier 30 which amplifies the deviation (Iq*−Iq) with a proportional gain Kqp, receives the deviation (Iq*−Iq), and outputs a q-axis current command signal Vq* so that the q-axis current value has desired response characteristics.

The first vibration suppressing circuit 73 has an integrator 74 with a gain Kmv, receives a deviation signal (Iq*−Iq) obtained by subtracting a q-axis current value Iq from the q-axis current command signal Iq*, and outputs a first current compensation signal Iqv to a subtracter 75 so that a given frequency factor in this deviation signal will be reduced. The subtracter 75 subtracts the first current compensation signal Iqv from the q-axis current command signal Iq*, and modifies the q-axis current command signal Iq* given to the first current compensating circuit 64.

Figure 28:
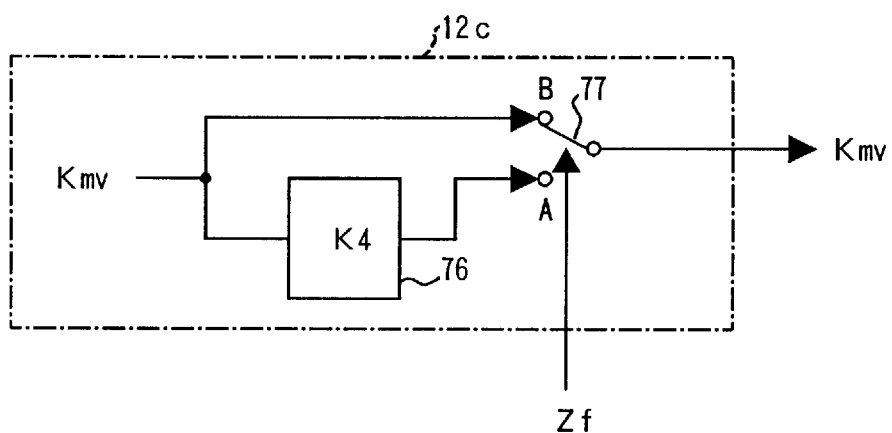
FIG. 28 is a block diagram showing a gain switching section in Embodiment 6 according to the present invention.

The gain Kmv of the integrator 74 is switched and set by a gain switching section 12c. The gain switching section 12c in this embodiment has, as shown in FIG. 28, a coefficient multiplier 76 with a gain K4 which proportionately reduces the gain Kmv, and a switch 77 which switches according to the determination signal Zf. The select switch 77 executes a switching operation according to the determination signal Zf from the determining circuit 11, and selects contact point A when the determination signal Zf is "0", namely, in the stop-instructed signal, and selects contact point B when the determination signal Zf is "1", namely in the operation-instructed state.

If the first vibration suppressing circuit 73 is not included, the transfer function Gic from the q-axis current command signal Iq* to the q-axis current command signal Vq*, namely the current compensator characteristics Gic is expressed by the following expression (3):

$$Gic = \frac{Kqps + Kqi}{s} \quad (3)$$

In contrast, when the first vibration suppressing circuit 73 is formed with the integrator 74, the transfer function Gim from the q-axis current command signal Iq* to the q-axis voltage command Vq* is expressed by the following expression (4):

$$Gim = \frac{s}{s + Kmv} \cdot \frac{Kqps + Kqi}{s} \quad (4)$$

In contrast to the expression (3), the current compensator characteristics Gim in this case is equivalent to a case where a current compensator including a primary high-pass filter having a transfer function Gp as expressed by the expression (5) is formed.

$$Gp = \frac{s}{s + Kmv} \quad (5)$$

Figure 29:
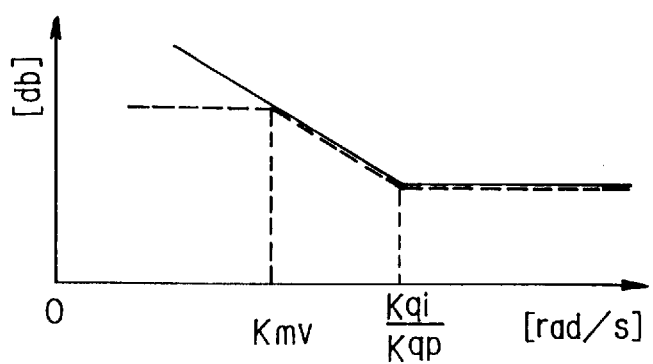
FIG. 29 is a graph showing gain characteristics in an compensator in Embodiment 6 according to the present invention.
Figure 30:
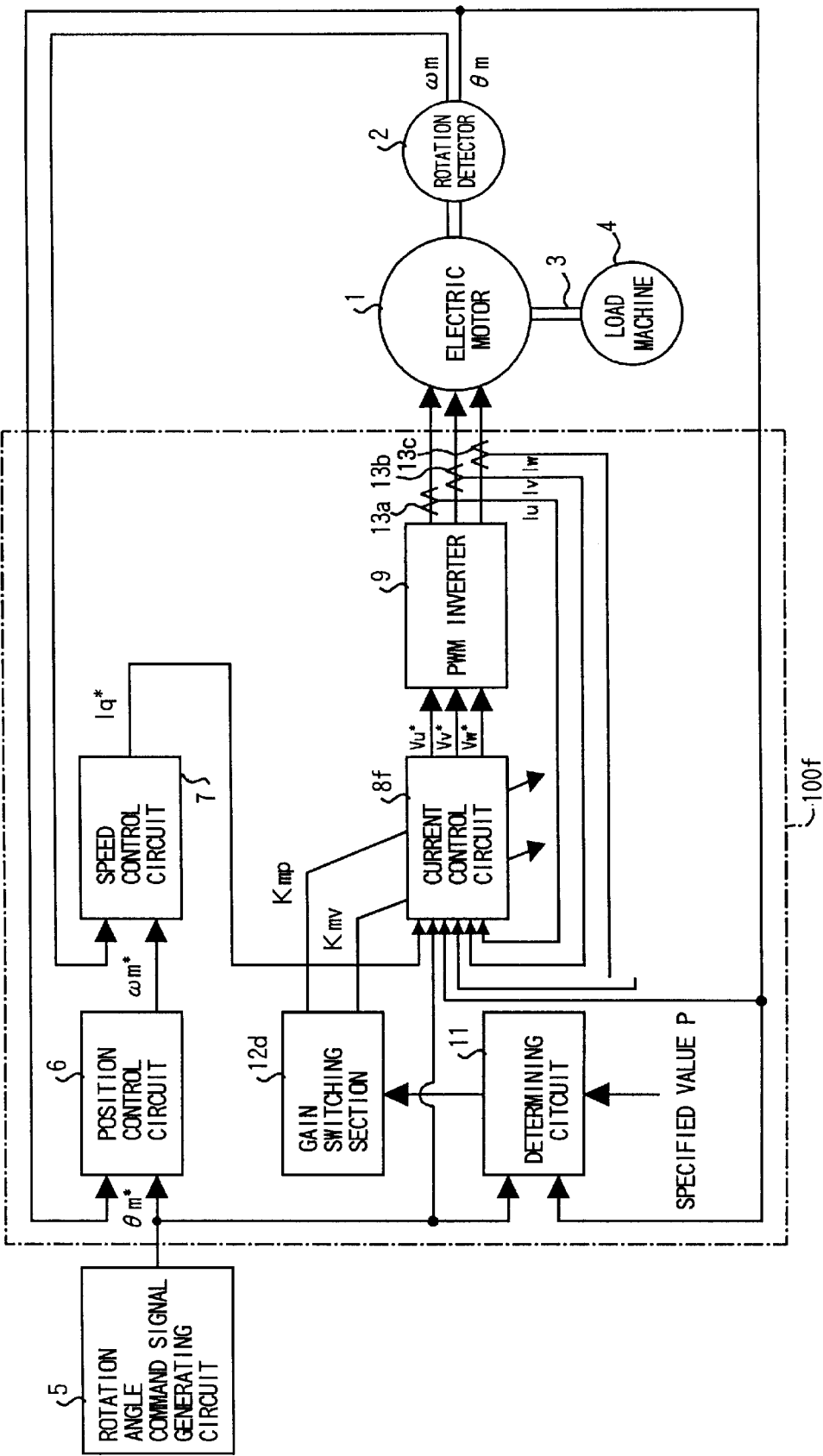
FIG. 30 is a block diagram showing general configuration of Embodiment 7 of the position control unit for an electric motor according to the present invention.
Figure 31:
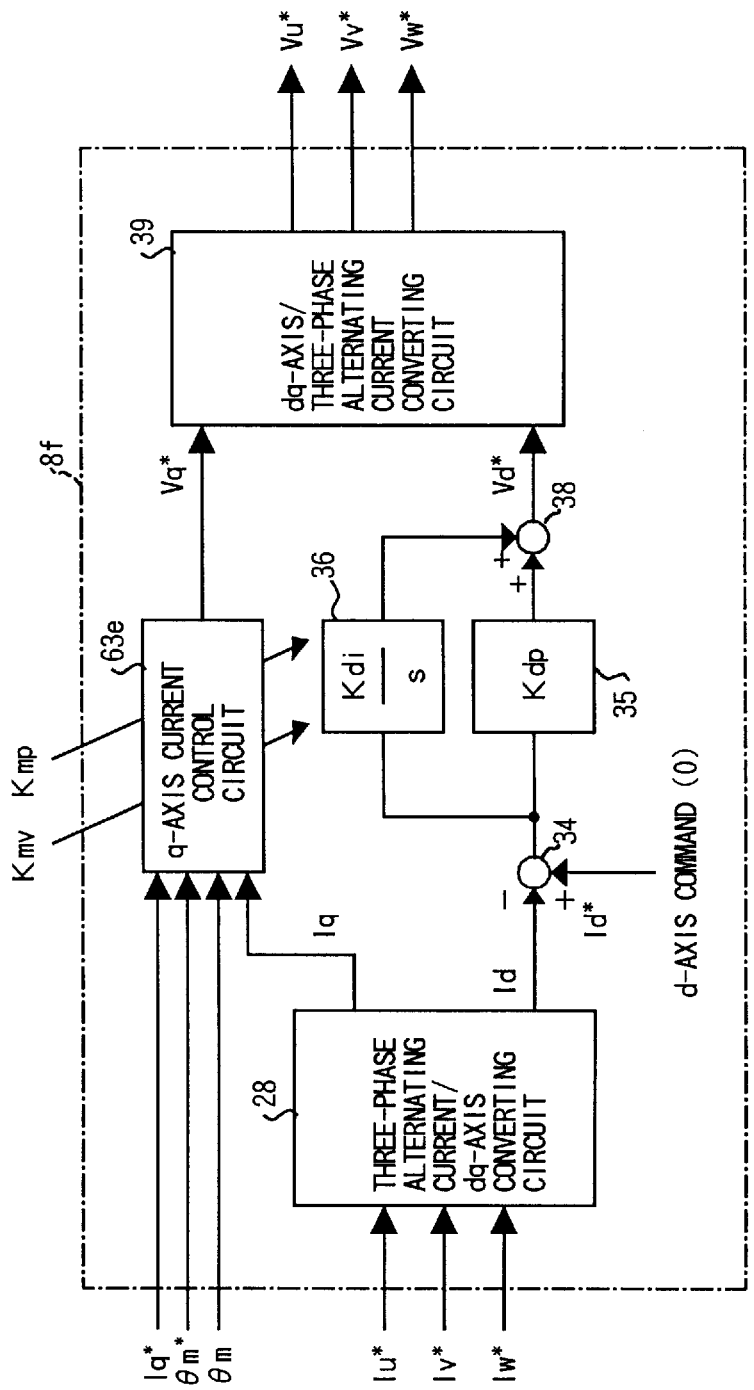
FIG. 31 is a block diagram showing a current control circuit in Embodiment 7 according to the present invention.

However, it is more preferable to realize the first vibration suppressing circuit 73 not by providing a high-pass filter in the previous stage from the first current compensating circuit 64, but as a feedback compensating structure as shown in FIG. 27, because it can be formed only with an integrator. The current compensator characteristics Gim shows a function to stop integration of a given low frequency side as shown in FIG. 29. This operation is effective in a case as described below.

As a proportional integrator such as the first current compensating circuit 64 amplifies a low frequency side of an input to a high gain, if a low frequency noise is included in a current detecting section, where a feedback signal is fetched out, the noise is largely amplified to generate an command for a high voltage, and it may cause vibration again even if movement of a mechanical moving section has completely been stopped due to the static friction. Especially in a case where the viscous friction of a rotary shaft section of the electric motor 1 is small, vibration with a low frequency may continue.

In a case where the rigidity of the torque transmission mechanism 3 connecting the load machine 4 to the electric motor 1 is low, vibration due to mechanical resonance may be generated between the load machine 4 and the electric motor 1 because of the low frequency noise factor.

In a case where the first vibration suppressing circuit 74 is formed with the integrator 73, the gain Kmv as expressed by the expression 4 is set so that a gain for a frequency causing mechanical resonance vibration will not become high, and integration is stopped in the side lower than a cut off frequency, and thus vibration of the electric motor 1 or the load machine 4 can be suppressed.

The transfer characteristics of the current compensator Gim can freely be designed by forming the first vibration suppressing circuit 74 not with a linear integrator, but with high-dimensional integrator to further improve the effect for suppressing the vibration in a vibration suppressed area.

Also in a case where an electric motor shaft equivalent inertia for the electric motor 1, torque transmission mechanism 3, and the load machine is J, the torque coefficient is Kt, and the current is i, an output Iqv from the first vibration suppressing circuit can also be regarded as a simulated rotational angular speed of the electric motor 1 from the relational expression of ω=(Kt/Js) between a current and a speed, when the gain Kmv of the integrator 73 is Kmv=Kt/J. This is equivalent to an estimated angular speed in a minute rotation angle area, so that it is effective when a resolution of the rotation detector 2 is low and an angular speed in the minutely vibrating state cannot be detected.

Description is made for Embodiment 7 of the position control unit for an electric motor according to the present invention with reference to FIGS. 30 to 33. It should be noted that, in FIGS. 30 to 32, the same reference numerals are assigned to the portions corresponding to those in FIGS. 25 to 27 and description thereof is omitted herein, and in FIG. 33, the same reference numerals are assigned to the portions corresponding to those in FIG. 28 and description thereof is omitted herein.

Figure 32:
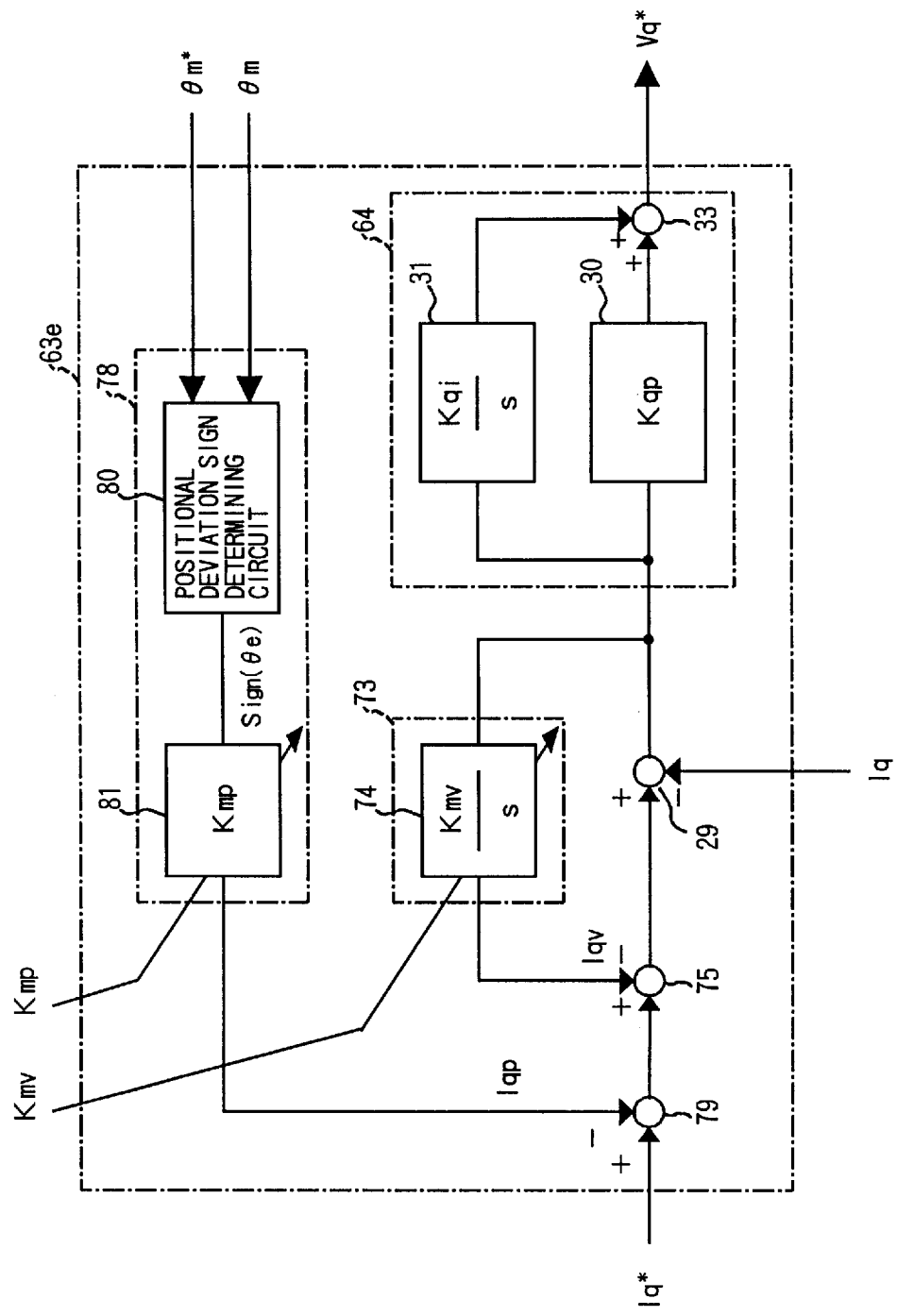
FIG. 32 is a block diagram showing a q-axis current control circuit in Embodiment 7 according to the present invention.

In this embodiment, as shown in FIG. 32, a q-axis current control circuit 63e comprises a second vibration suppressing circuit 78 and a subtracter 79 in addition to a first current compensating circuit 64 and the first vibration suppressing circuit 73.

The second vibration suppressing circuit 78 comprises a positional deviation sign determining circuit 80 for receiving a positional command signal θm* and an actual position signal θm and for outputting a polarity sign (θe) for a positional deviation, and a coefficient multiplier 81 for a gain Kmp, and outputs a second current compensation signal Iqp to the subtracter 79. The subtracter 79 subtracts the second current compensation signal Iqv from the q-axis current command signal Iq*, and modifies the q-axis current command signal Iq* given to the subtracter 75.

Figure 33:
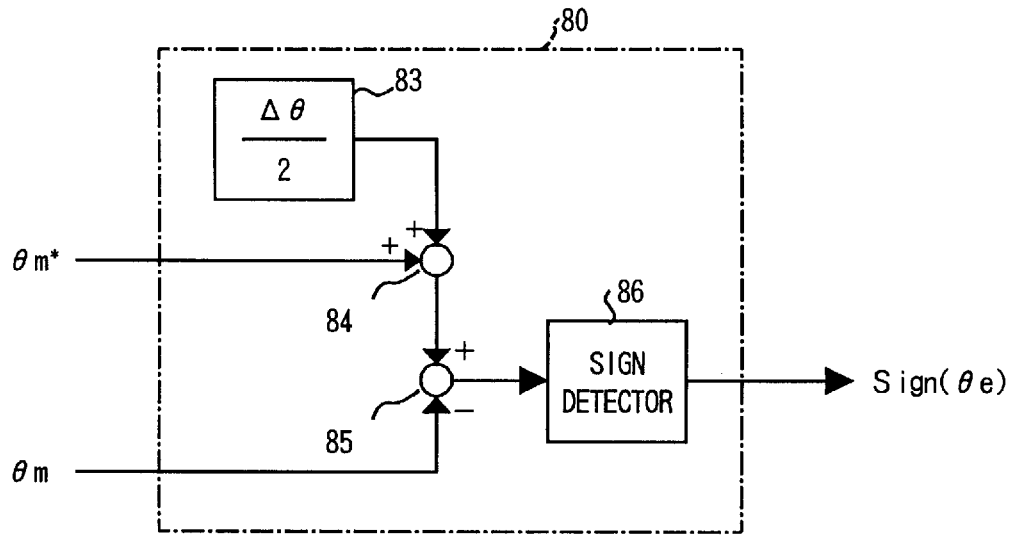
FIG. 33 is a block diagram showing a positional deviation sign determining circuit in Embodiment 7 according to the present invention.

The positional deviation sign determining circuit 80 comprises, as shown in FIG. 33, a coefficient multiplier 83 for outputting a constant value Δθ/2, an adder 84 for summing up an output from the coefficient multiplier 83 and the positional command signal θm*, a subtracter 85 for subtracting the actual position signal θm from an output from the adder 84, and a sign detector 86 for receiving the output from the subtracter 85 and for outputting the positive/negative polarity signals.

The positional deviation sign determining circuit 80, a case where a positional command signal θm* and an actual position signal θm can not be analog signals but be quantized digital signals being taken into consideration, subtracts an actual position signal θm from a value adding a value of ½ of a minimum position resolution Δθ in an actual position signal θm to an off-set for a positional command signal θm* if it is a digital signal, and always outputs a positive/negative sign signal by outputting the polarity even if it is a digital signal.

Figure 34:
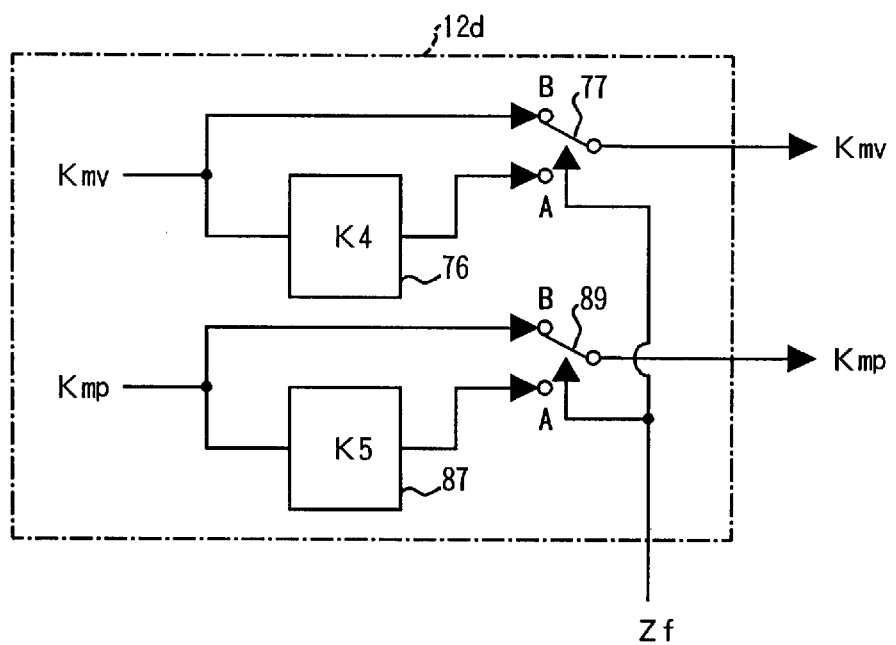
FIG. 34 is a block diagram showing a gain switching section in Embodiment 7 according to the present invention.
Figure 35:
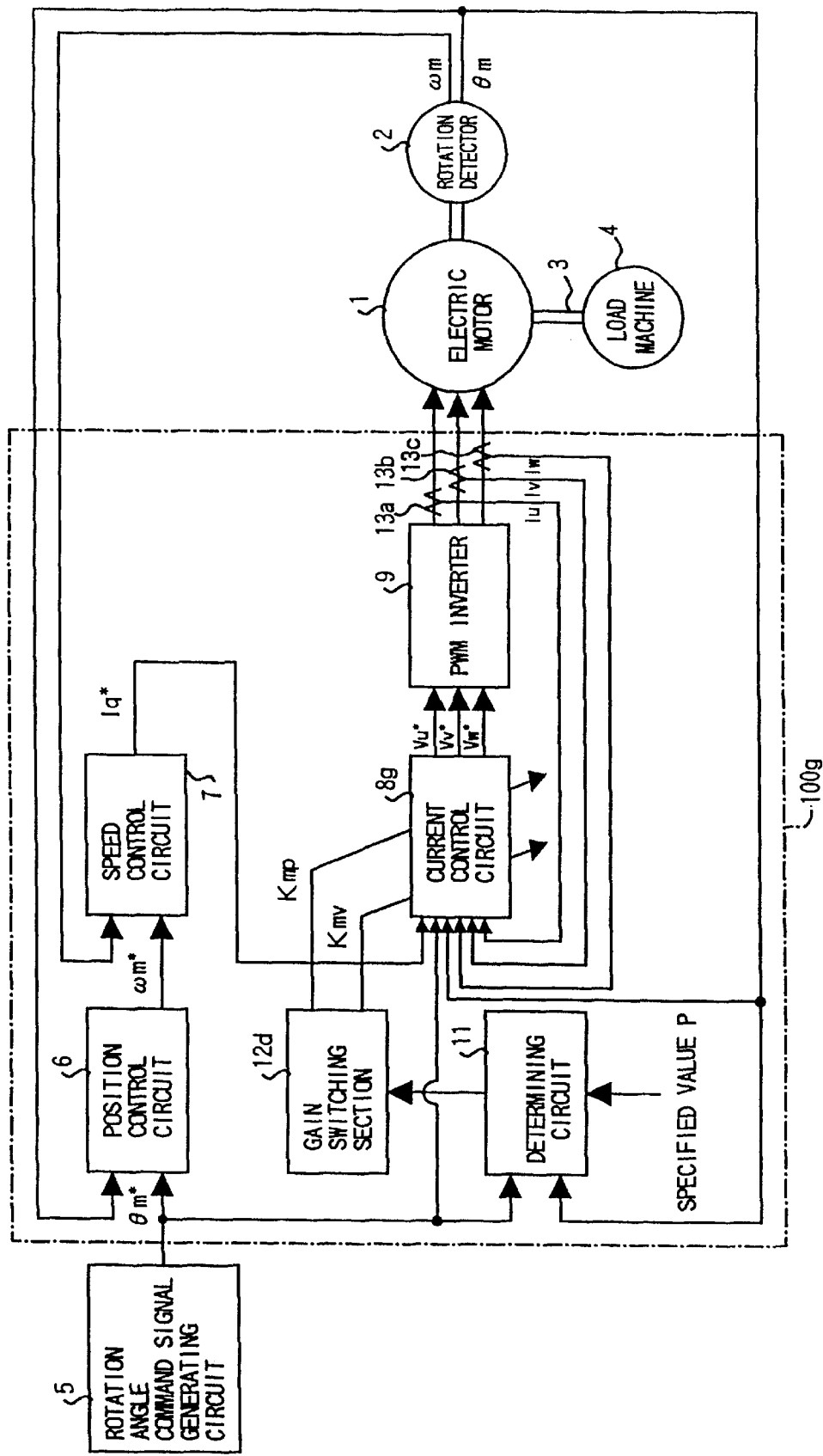
FIG. 35 is a block diagram showing general configuration of Embodiment 8 of the position control unit for an electric motor according to the present invention.
Figure 36:
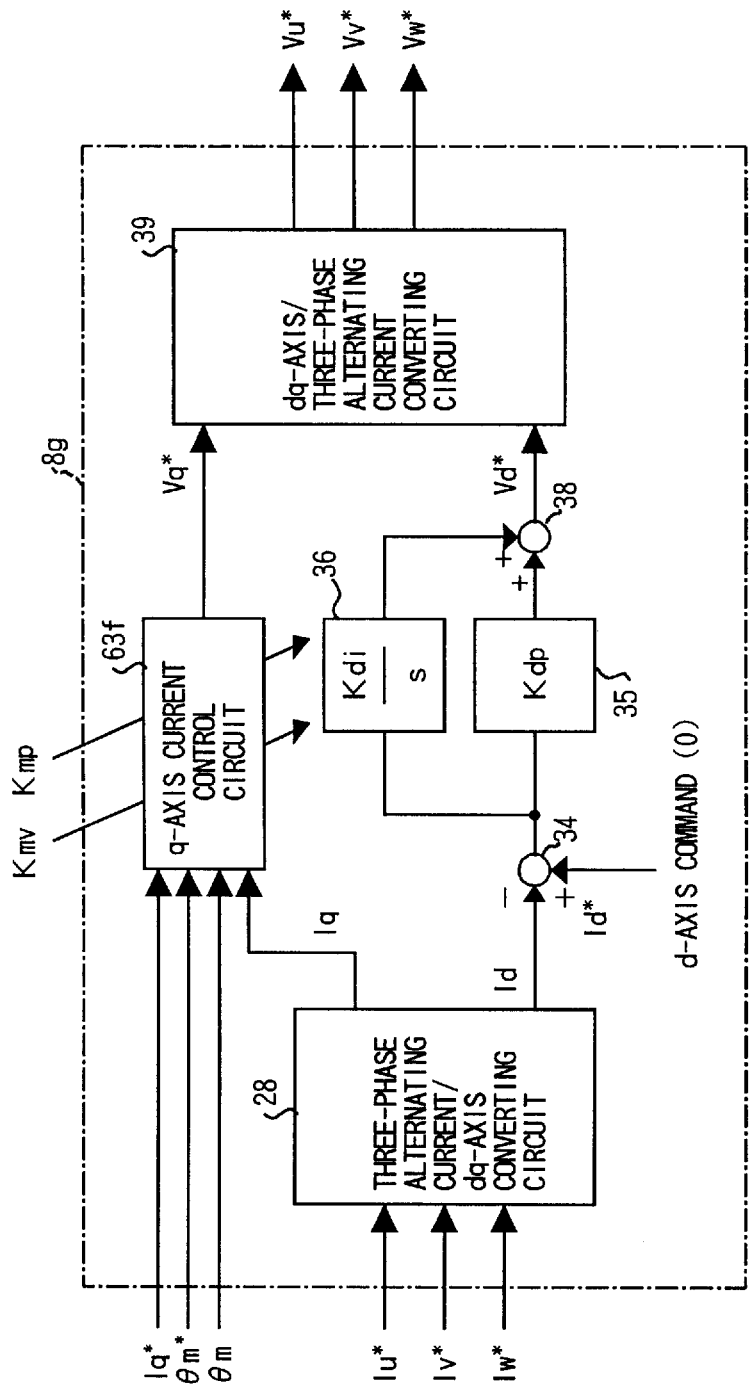
FIG. 36 is a block diagram showing a current control circuit in Embodiment 8 according to the present invention.

A gain Kmv for an integrator 74 and a gain Kmp for a coefficient multiplier 81 are set to switch by a gain switching section 12d. The gain switching section 12d in the embodiment comprises, as shown in FIG. 34, a coefficient multiplier 76 for a gain K4 for proportionally reducing a gain Kmv, a coefficient multiplier 87 for a gain K5 for proportionally reducing a gain Kmp, and switches 77 and 89 for switching according to a determination signal Zf. The switches for switching 77 and 89 are operated according to a determination signal Zf from the determining circuit 11, and in a case where a value of a determination signal Zf is zero, namely in a stop-instructed state, a gain is switched to the contact point A, and in a case where a value of a determination signal Zf is one, namely in an operation-instructed state, a gain is switched to the contact point B.

In the embodiment, by adding a sign signal for a position to a q-axis current command signal in addition to the operation in Embodiment 6, an effect for suppressing a vibration can further be improved in the vibration suppressing mode.

Description is made for Embodiment 8 of the position control unit for an electric motor according to the present invention with reference to FIGS. 35 to 39. It should be noted that, in FIGS. 35 to 37, the same reference numerals are assigned to the portions corresponding to those in FIGS. 30 to 32 and description thereof is omitted herein.

Figure 37:
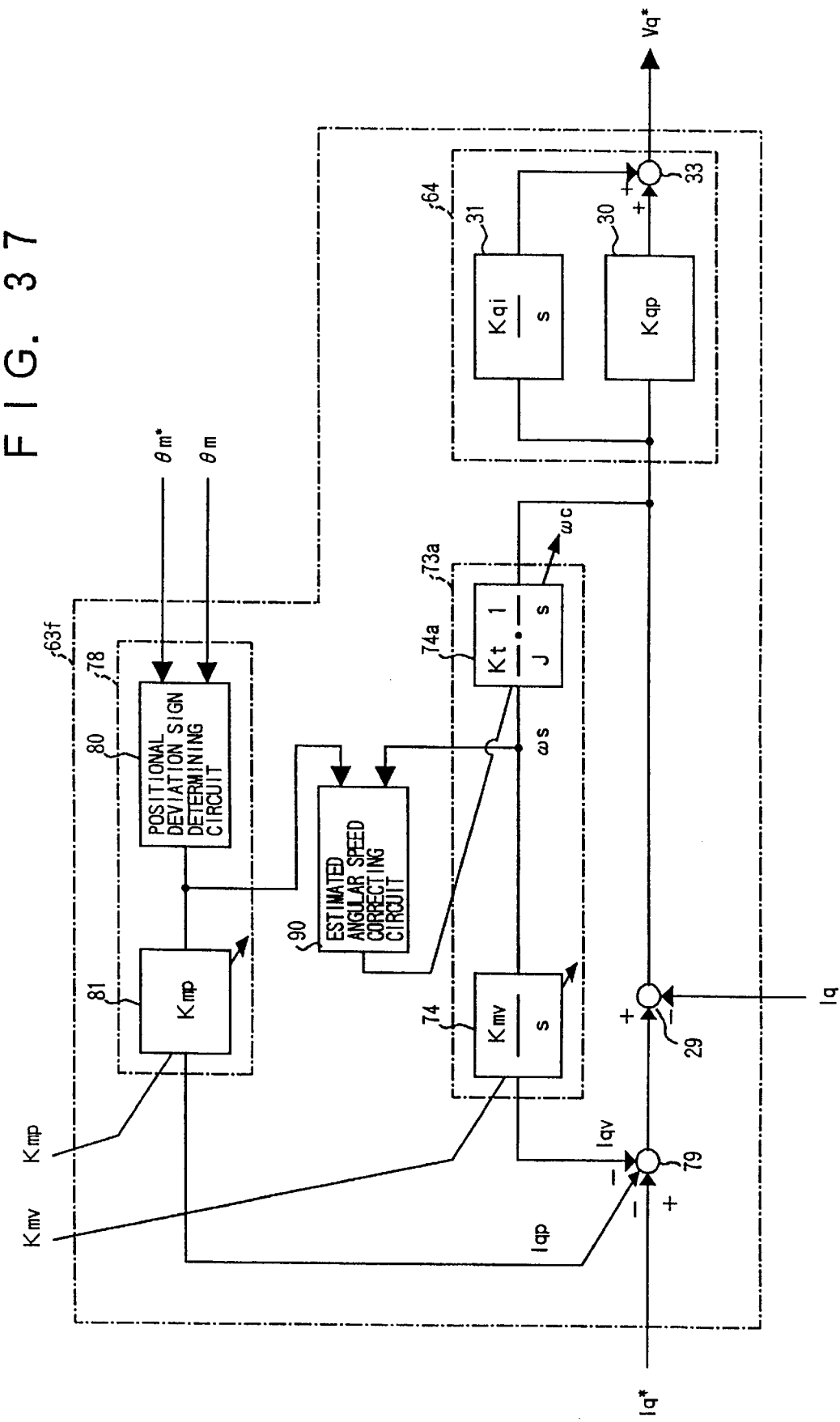
FIG. 37 is a block diagram showing a q-axis current control circuit in Embodiment 8 according to the present invention.
Figure 42:
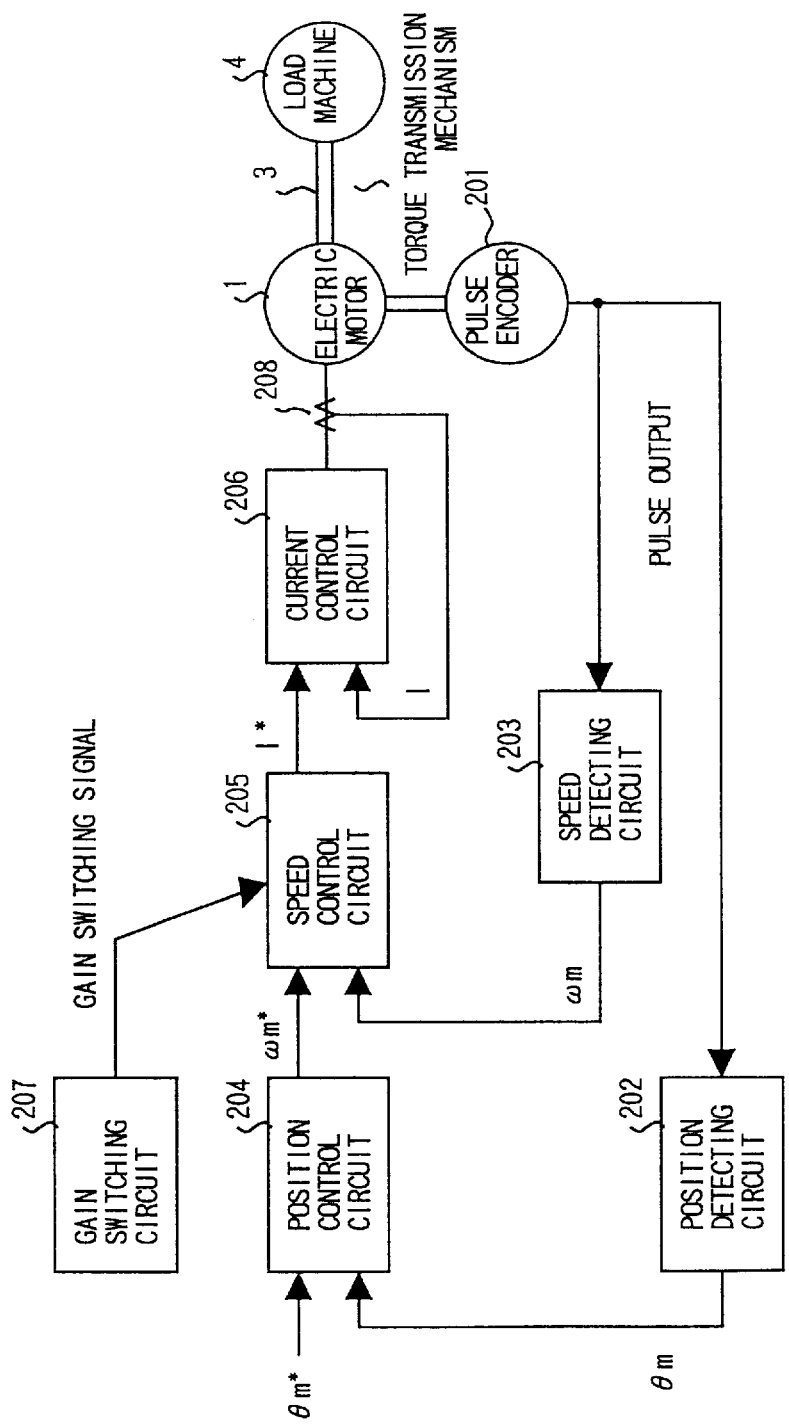
FIG. 42 is a block diagram showing a conventional type of a position control unit for an electric motor.
Figure 43:
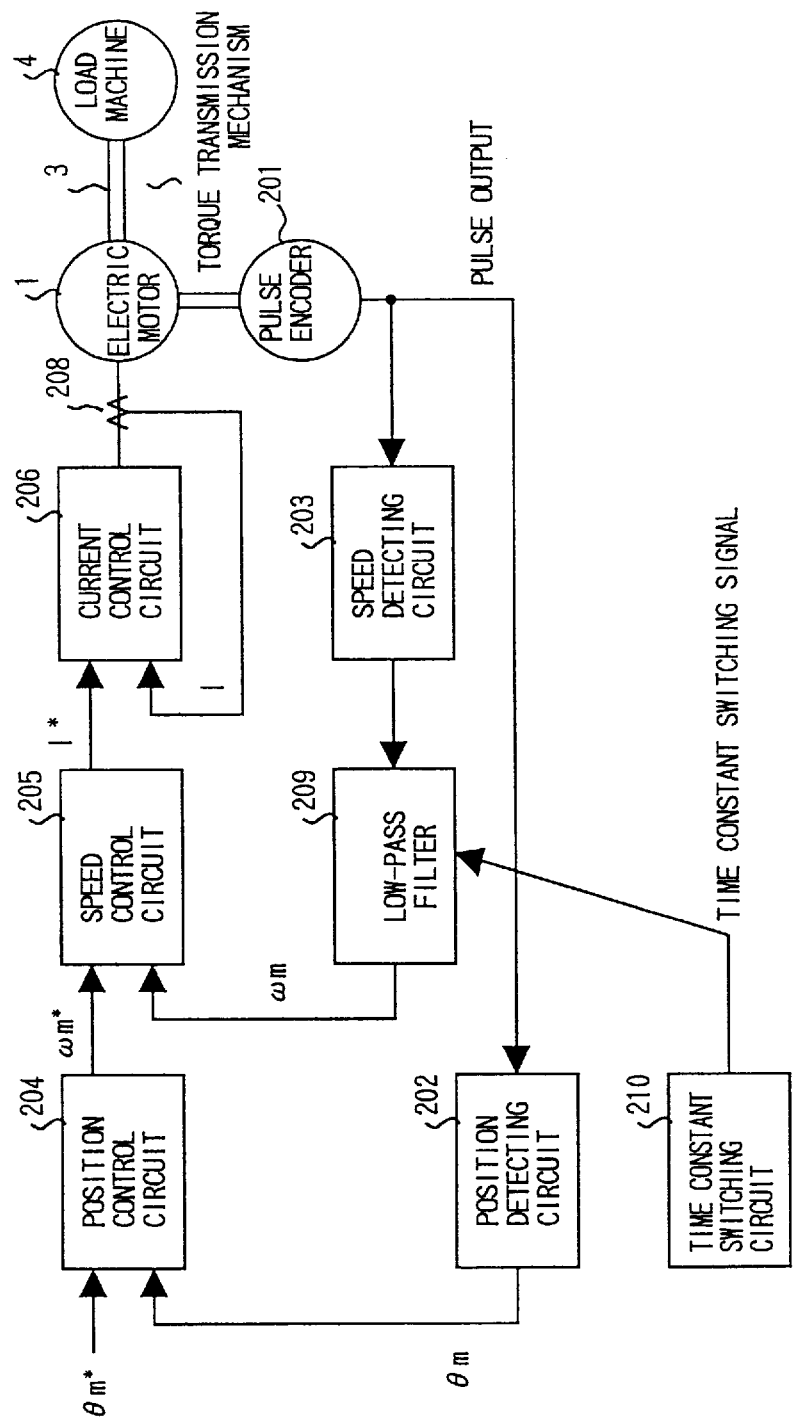
FIG. 43 is a block diagram showing a conventional type of a position control unit for an electric motor.

In this embodiment, as shown in FIG. 37, a q-axis current control circuit 63f comprises an estimated angular speed correcting circuit 90 in addition to a first current compensating circuit 64, a first vibration suppressing circuit 73a, a second vibration suppressing circuit 78, and a subtracter 79.

The estimated angular speed correcting circuit 90 comprises, as shown in FIG. 38, a sign change determining circuit 91 for receiving a sign signal Sign (θe) from the positional deviation sign determining circuit 80 and for outputting a sign change signal Δ Sign (θe) when the sign of the positional deviation has changed, a counter circuit 92 for measuring a period of time until the sign change signal is received and in which a counter value is reset to "0" when the sign change signal has been received, and an estimated rotational speed modifying circuit 93 for receiving the sign change signal Δ Sign (θe), a count time Ti which is an output from the counter circuit 92, and an output ωs from an integrator 74a and for outputting an estimated rotational speed modifying signal ωc.

The estimated rotational speed modifying circuit 93 comprises, as shown in FIG. 39, a coefficient multiplier 95 for outputting a constant zero, an integrator 96 for receiving an output ωs from an integrator 74a and modifying an internal integrated value when the output from the coefficient multiplier 95 is given thereto, a divider 97 for dividing an output from the integrator 96 by a count time Ti, and switches 98 and 99 for closing the contacting point only the period of time when the polarity change signal Δ Sign (θe) is been given thereto.

The first vibration suppressing circuit 73a comprises an integrator 74 for a gain Kmv given thereto an output from the integrator 74a in addition to the integrator 74a for a gain Kt/J.

The gain of the integrator 74a is Kt/J, and when a modified estimated rotational speed ωc is given from the estimated angular speed correcting circuit 90 thereto, the value of modified estimated rotational speed ωc is added to the internal value in the integrator 74a. It should be noted that, Kt indicates a current/torque converting factor, J indicates an electric motor shaft equivalent inertia value for the electric motor 1, torque transmission mechanism 3, and load machine.

In a case where it is assumed that the gain for the integrator 74a is set to Kt/J, an output from this integrator 74a can be regarded as an estimated rotational angular speed of a rotary shaft in the electric motor 1: ωs=(Kt/Js) I.

The output from the integrator 74a regarded as an estimated rotational angler speed ωs of a rotary shaft in the electric motor 1 can be regarded as an estimated rotation angle θs of the rotary shaft in the electric motor 1 by being integrated by the integrator 96.

FIG. 40 shows a relation between a signal (an actual position signal θm) from an actual rotation angle θ as well as the rotation detector 2 of the electric motor 1 and a target positioning point. In FIG. 40 the actual position signal θm from the rotation detector 2 is quantized, but the positional deviation sign determining circuit 80 can detect whether the motor has passed the target positioning point or not regardless of an actual position signal θm in analog or in digital, so that the instant of the positional deviation being "0" can be detected. An estimated error θc of an estimated rotation angle θs in this instant is obtained by the following expression:

$$\theta c = 0 - \theta s.$$

It can be considered that this estimated error θc is caused by an accumulated error of an integrated value in the integrator 74a before passing the integrator 96, so that the estimated error is divided by the count time Ti in which the period of time until a sign of a positional deviation is reversed is counted as indicated by the expression: ωc=θc/Ti, the value obtained as described above is regarded as a modified estimated error ωc, and the modified estimated error ωc is added to the integrated value of the integrator 74a at the point of time as indicated by the expression: ωs=ωs+ωc, whereby the accumulated error of the estimated rotational angler speed ωs of the rotary shaft in the electric motor 1 can be corrected, which makes it possible to obtain more accurate estimated rotational angle speed.

For this reason, even in a case where a rough-precision rotation detector 2 can not detect precisely a rotation angle as well as a rotational angular speed of the electric motor 1 in a stop-instructed state, or in a case where it can not detect them at all, it is possible to obtain an accurate estimated rotation angle with this embodiment, and feedback of the estimated rotational angular speed signal makes it possible to extremely reduce a vibration generated by the electric motor 1 or the load machine 4.

As understood from the description above, with the position control unit for an electric motor according to an aspect of the present invention, a gain of the torque control means for controlling a torque for an electric motor is switched according to whether a deviation between the positional command signal and the position detecting signal is larger or smaller than a reference value for gain switching for a positional deviation, so that an preferable response according to the positional deviation can be given to the torque control means, and it is possible to realize a high-speed and high-precision positioning control by suppressing a minute vibration in a stop-instructed state.

With the position control unit for an electric motor according to another aspect of the present invention, a reference value for gain switching for a positional deviation is set according to the torque equivalent signal detected when the torque control means is not working, and a gain of the torque control means is switched according to whether a deviation between the positional command signal and the positional detecting signal is larger or smaller than the reference value for gain switching, so that an optimal reference value for gain switching according to a noise level of the torque equivalent signal in the torque control means can be given to the gain switching means, and at the same time a preferable response according to the positional deviation can be given to the torque control means, so that it is possible to realize a high-speed and high-precision positioning control by suppressing a minute vibration in a stop-instructed state.

With the position control unit for an electric motor according to another aspect of the present invention, in a case where a absolute value for a deviation between the positional command signal and the position detecting signal is smaller than the reference value for gain switching, a gain for the torque control means is switched to a lower one, and otherwise to a higher one, so that high-precision positioning control in which a minute vibration is suppressed can be realized in a stop-instructed state, and otherwise, namely in an operation-instructed state, a position control with high-speed response can be realized.

With the position control unit for an electric motor according to another aspect of the present invention, a cut off frequency for the low-pass filter removing therefrom unnecessary high frequency wave factors included in an output from the torque equivalent detecting means is switched according to whether a deviation between the positional command signal and the positional detecting signal is larger and smaller than the reference value for cut off frequency switching for a positional deviation, so that a preferable response can be given to the torque control means according to the positional deviation, and for this reason it is possible to realize a high-speed and high-precision positioning control by suppressing a minute vibration in a stop-instructed state.

With the position control unit for an electric motor according to another aspect of the present invention, a cut off frequency switching reference value for a position is set according to an output from the torque equivalent detecting means when the torque control means is not working, so that an optimal cut off frequency switching reference value according to a noise level for the torque equivalent signal in the torque control means can be given to the cut off frequency switching means, which makes it possible to obtain a better effect for suppressing a minute vibration.

With the position control unit for an electric motor according to another aspect of the present invention, the cut off frequency for a low-pass filter is switched to lower one in a case where an absolute value of a deviation between the positional command signal and a position detecting signal is smaller than the cut off frequency switching reference value, and otherwise to a higher one, so that a high-precision positioning control in which a minute vibration is suppressed can be realized in a stop-instructed state, and otherwise, namely in an operation-instructed state, a position control with a high response can be realized.

With the position control unit for an electric motor according to another aspect of the present invention, a phase current in the electric motor is detected as one of factors of a torque of the electric motor, a high frequency wave factor of the phase current is detected when the torque control means is not working, and the reference value for gain switching or the reference value for cut off frequency switching are set in response to the high frequency wave factor, so that an optimal reference value for cut off frequency switching according to the noise level of the torque equivalent signal in the torque control means can be given to the cut off frequency switching means without requiring any particular measuring means, which makes it possible to obtain a better effect for suppressing a minute vibration.

With the position control unit for an electric motor according to another aspect of the present invention, a current compensating means (a second current compensating means) for feed forward compensation for receiving a torque equivalent current command according to a torque command signal and for outputting a torque equivalent voltage command is provided therein, and a gain for the torque control means is switched to a lower one excluding the current compensating means for feed forward compensation when an absolute value for a deviation between the positional command signal and the position detecting signal is smaller than the reference value for gain switching, and otherwise to a higher one, so that change in target value response characteristic of a current control circuit section before or after gain switching can freely be made smaller, a gain switching can be executed without generating a vibration caused by gain switching, and at the same time the vibration caused by noise can be suppressed in the mode of suppressing a vibration.

With the position control unit for an electric motor according to another aspect of the present invention, a current compensating means (the second current compensating means) for feed forward compensation for receiving a torque equivalent current command according to a torque command signal and for outputting a torque equivalent voltage command is provided therein, and a gain for the torque control means including the current compensating means for feed forward compensation is switched to a lower one when an absolute value for a deviation between the positional command signal and the position detecting signal is smaller than the reference value for gain switching, and otherwise to a higher one, so that the current target response characteristics before and after gain switching can discretely be set respectively, and gain switching can be executed without generating any vibrations caused by gain switching, and at the same time a vibration caused by noise can be suppressed in the mode of suppressing a vibration.

With the position control unit for an electric motor according to another aspect of the present invention, the current compensating means (the second current compensating means) for feed forward compensation for receiving a torque equivalent current command according to the torque command signal and for outputting a torque equivalent voltage command, and a current compensating means (a third current compensating means) for receiving the torque equivalent voltage command and for outputting so that the torque equivalent voltage command even in gain switching will be smoothly changed are provided therein, and a gain including a gain in the torque control means is switched to a lower one when an absolute value of a deviation between the positional command signal and the position detecting signal is smaller than the gain switching reference value, and otherwise to a higher one, so that current target response characteristics before and after gain switching can discretely be set respectively, and at the same time a voltage command signal can smoothly be changed, which makes it possible to suppress a vibration caused by noise in the mode of suppressing a vibration.

With the position control unit for an electric motor according to another aspect of the present invention, the third current compensating means comprises a primary delay circuit selectively switched thereto and used in gain switching, so that a voltage command signal before and after gain switching can accurately and smoothly be changed.

With the position control unit for an electric motor according to another aspect of the present invention, a deviation signal obtained by subtracting a torque equivalent signal from a torque equivalent current command value is received thereto and the first current compensation signal is outputted so that a signal in given frequency of the deviation signal will become smaller, and a deviation signal obtained by subtracting the first current compensation signal from the torque equivalent current command value is used as a new torque equivalent current command value, so that it is possible to estimate whether a frequency factor of vibration generated when the servo of the electric motor is locked or a rotational speed thereof is low, and also to freely adjust a detected current signal in the frequency band, and for this reason a vibration of an electric motor generated in a stop-instructed state or in its low-speed rotation can extremely be reduced.

With the position control unit for an electric motor according to another aspect of the present invention, the first vibration suppressing means comprises an integrator in which a gain is set so that a gain of a frequency at which a mechanical resonance between the electric motor and a load machine is generated will not become a high gain, so that a vibration of an electric motor generated in a stop-instructed state or in its low-speed rotation can extremely be reduced with the simple configuration.

With the position control unit for an electric motor according to another aspect of the present invention, the first vibration suppressing means receives a deviation signal obtained by subtracting a torque equivalent signal from a torque equivalent current command value and outputs a first current compensation signal so that a given frequency signal of the deviation signal will become smaller, and the second vibration suppressing means receives a positional command signal from the outside and an actual rotation angle signal from a rotation detector and outputs a second current compensation signal so that a positional deviation from a target positioning point becomes smaller, and a deviation signal obtained by subtracting the second current compensation signal and the first current compensation signal from the torque equivalent current command value is used as a new torque equivalent command value, so that it is possible to estimate whether a frequency factor of vibration generated when the servo motor is locked and to freely adjust a detected current signal of the frequency band, and for this reason a vibration of the electric motor generated in a stop-instructed state including the period of time when servo thereof is locked can extremely be reduced.

With the position control unit for an electric motor according to another aspect of the present invention, the positional deviation sign determining circuit outputs a polarity (a sign) of a positional deviation from a target positioning point according to the positional command signal and the actual rotation angle signal, and gives a specified gain to a polarity output of the positional deviation from the positional deviation sign determining circuit and outputs the second current compensation signal, so that vibration of the electric motor generated in a stop-instructed state including the period of time when servo thereof is locked can accurately be reduced.

With the position control unit for an electric motor according to another aspect of the present invention, the angular speed estimating means receives a deviation signal obtained by subtracting a torque equivalent current signal from the torque equivalent current command value and outputs an estimated angular speed of the electric motor, the positional deviation sign determination means receives a positional command signal from the outside and an actual rotation angle signal from the rotation detector and outputs a polarity of a positional deviation from a target positioning point, the estimated angular speed correcting means receives a polarity signal of a positional deviation from the positional deviation sign determination means and an estimated angular speed from the angular speed estimating means and corrects the estimated angular speed, the first vibration suppressing means receives an estimated angular speed signal from the angular speed estimating means and outputs a first current compensation signal so that the actual angular speed will be reduced with desired response characteristics, the second vibration suppressing means receives a polarity signal of a positional deviation from the positional deviation sign determination means and outputs a second current compensation signal so that a positional deviation from the instructed position will be reduced, and a deviation signal obtained by subtracting the second current compensation signal and the first current compensation signal from the torque equivalent current command value is used as a new torque equivalent current command value, so that, even in a case where an actual angular speed is impossible to be detected due to rough precision of the rotation detector or in a case where precision thereof is extremely bad, a high-precision angular speed can be estimated, and for this reason a vibration of the electric motor generated in a stop-instructed state including the period of time when the servo is locked can extremely be reduced.

This application is based on Japanese patent application No. HEI 7-252313 filed in the Japanese Patent Office on Sep. 29, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A position control unit for an electric motor comprising:
    a position detection means for detecting a position of the electric motor and outputting a position detecting signal;
    a torque command computing means for outputting a torque command signal according to a positional command signal received from a source external to the position control unit and said position detecting signal;
    a torque control means for controlling a torque of said electric motor according to said torque command signal; and
    a gain switching means for switching a gain of said torque control means according to whether an absolute value of a deviation between said positional command signal and said position detecting signal is larger or smaller than a reference value for gain switching for a positional deviation.

2. A position control unit for an electric motor according to claim 1; wherein said gain switching means switches a gain for said torque control means to a first value when an absolute value of a deviation between said positional command signal and said position detecting signal is smaller than said reference value for gain switching, and said gain switching means switches a gain for said torque control means to a second value higher than said first value when the absolute value of the deviation between said positional command signal and said position detecting signal is not smaller than said reference value for gain switching.

3. A position control unit for an electric motor comprising:
    a position detection means for detecting a position of the electric motor and outputting a position detecting signal;
    a torque command computing means for outputting a torque command signal according to a positional command signal received from a source external to the position control unit and said position detecting signal;
    a torque equivalent detecting means for detecting a current of said electric motor indicating a torque of said electric motor and outputting a torque equivalent signal;
    a torque control means for controlling a torque of said electric motor according to said torque command signal and said torque equivalent signal;
    a reference value setting means for setting a reference value for gain switching for a positional deviation according to said torque equivalent signal detected during a period when said torque control means is not controlling the torque of said electric motor; and
    a gain switching means for switching a gain for said torque control means to a first value when an absolute value of a deviation between said positional command signal and said position detecting signal is smaller than said reference value for gain switching, and said gain switching means switches a gain for said torque control means to a second value higher than said first value when the absolute value of the deviation between said positional command signal and said position detecting signal is not smaller than said reference value for gain switching.

4. A position control unit for an electric motor according to claim 3; wherein said torque equivalent detecting means detects a phase current in said electric motor as the current of said electric motor indicating the torque of said electric motor, said reference value setting means detects a high frequency component of said phase current during a period when said torque control means is not controlling the torque of said electric motor and sets said reference value for gain switching according to said high frequency component.

5. A position control unit for an electric motor comprising:
    a position detection means for detecting a position of the electric motor and outputting a position detecting signal;
    a torque command computing means for outputting a torque command signal according to a positional command signal received from a source external to the position control unit and said position detecting signal;
    a torque equivalent detecting means for detecting a current of said electric motor indicating a torque of the electric motor;
    a low-pass filter for removing unnecessary high frequency wave elements included in an output from said torque equivalent detecting means;
    a torque control means for controlling a torque of said electric motor according to said torque command signal as well as to an output from said low-pass filter; and
    a cut off frequency switching means for switching a cut off frequency for said low-pass filter to a first value when an absolute value of a deviation between said positional command signal and said position detecting signal is smaller than a reference value for cut off frequency switching for a positional deviation and for switching the cut off frequency for said low-pass filter to a second value larger than said first value when the absolute value of the deviation between said positional command signal and said position detecting signal is not smaller than the reference value for cut off frequency switching for a positional deviation.

6. A positional control unit according to claim 5 comprising:
    a reference value setting means for setting said reference value for cut off frequency switching according to an output from the torque equivalent detecting means detected when said torque control means is not controlling the torque of said electric motor.

7. A position control unit for an electric motor according to claim 6; wherein said torque equivalent detecting means detects a phase current in said electric motor as the current of said electric motor indicating a torque of said electric motor, said reference value setting means detects a high frequency wave component of said phase current during a period when said torque control means is not controlling the torque of said electric motor and sets said reference value for said reference value for cut off frequency switching according to said high frequency wave component.

8. A position control unit for an electric motor according to claim 5; wherein said cut off frequency switching means switches a cut off frequency for said low-pass filter, when an absolute value of a deviation between a positional command signal and a position detecting signal is smaller than said reference value for cut off frequency switching, to a lower one, and otherwise to a higher one.

9. A position control means for an electric motor comprising:

a position detection means for detecting a position of the electric motor and outputting a position detecting signal;

a torque command computing means for outputting a torque command signal according to a positional command signal received from a source external to the position control unit and said position detecting signal;

a torque equivalent detecting means for detecting a current of said electric motor indicating a torque of said electric motor and outputting a torque equivalent signal; and a torque control means for controlling a torque of said electric motor according to said torque command signal and said torque equivalent signal; wherein said torque control means comprises:

means for outputting a torque equivalent current signal in accordance with said torque equivalent signal;

means for outputting a torque equivalent current command signal in accordance with said torque command signal and said torque equivalent current signal;

a first current compensating means for outputting a voltage command according to said torque equivalent current command signal;

a second current compensating means for outputting a torque equivalent voltage command according to said torque equivalent current command; and the positional control unit also comprises:

a gain switching means for switching a gain for said first current compensating means to a first value when an absolute value of a deviation between said positional command signal and said position detecting signal is smaller than a reference value for gain switching for a positional deviation, and to a second value, higher than said first value, when the absolute value of the deviation between said positional command signal and said position detecting signal is not smaller than the reference value for gain switching for the positional deviation.

10. A positional control unit comprising:

a position detection means for detecting a position of an electric motor and outputting a position detecting signal;

a torque command computing means for outputting a torque command signal according to a positional command signal received from a source external to the position control unit and said position detecting signal;

a torque equivalent detecting means for detecting a current of said electric motor indicating a torque of said electric motor and outputting a torque equivalent signal; and a torque control means for controlling a torque of said electric motor according to said torque command signal and said torque equivalent signal; wherein said torque control means comprises:

means for receiving said torque equivalent signal from said torque equivalent detecting means and outputting a torque equivalent current signal in accordance with said torque equivalent signal;

means for receiving said torque command signal and said torque equivalent current signal and outputting a torque equivalent current command signal in accordance with said torque command signal and said torque equivalent current signal;

a first current compensating means for outputting a voltage command according to said torque equivalent current command signal; and a second current compensating means for outputting a torque equivalent voltage command according to said torque equivalent current command; and the positional control unit also comprises:

a gain switching means for switching gains for said first current compensating means and said second current compensating means to respective first and second values when an absolute value of a deviation between said positional command signal and said position detecting signal is smaller than a reference value for gain switching for a positional deviation, and to respective third and fourth values when the absolute value of the deviation between said positional command signal and said position detecting signal is not smaller than the reference value for gain switching for the positional deviation, wherein said third and fourth values are respectively greater than said first and second values.

11. A position control unit for an electric motor according to claim 10; wherein said torque control means has, in addition to said first current compensating means and said second current compensating means, a third current compensating means for receiving said torque equivalent voltage command, modifying said torque equivalent voltage command so that change in said torque equivalent voltage command in gain switching will be smoother, and outputting the modified command.

12. A position control unit for an electric motor according to claim 11; wherein said third current compensating means has a primary delay circuit selectively switched thereto and used in gain switching.

13. A position control unit for an electric motor comprising:

a position detection means for detecting a position of the electric motor and outputting a position detecting signal;

a torque command computing means for outputting a torque command signal according to a positional command signal received from a source external to the position control unit and said position detecting signal;

a torque equivalent detecting means for detecting a current of said electric motor indicating a torque of said electric motor and outputting a torque equivalent signal; and a torque control means for controlling a torque of said electric motor according to said torque command signal and said torque equivalent current signal; wherein said torque control means comprises:

means for receiving said torque equivalent signal from said torque equivalent detecting means and outputting a torque equivalent current signal in accordance with said torque equivalent signal;

a first subtracter for subtracting a first current compensation signal from said torque command signal to produce a torque equivalent current command signal;

a second subtracter for subtracting said torque equivalent current signal from said torque equivalent current command signal to produce a deviation signal;

a first vibration suppressing means for receiving the deviation signal and outputting a signal which is the first current compensation signal so that a specific frequency component of said deviation signal will become smaller.

14. A position control means for an electric motor according to claim 13; wherein said first vibration suppressing means comprises an integrator having a gain which is set so that a gain of a frequency at which a mechanical resonance between said electric motor and a load machine is generated will be minimized.

15. A positional control unit according to claim 13; wherein said torque control means has, in addition to said first vibration suppressing means, a second vibration suppressing means for receiving the positional command signal and an actual rotation angle signal from a rotation detector and outputting a second current compensation signal so that a positional deviation from a target positioning point will become smaller, and a deviation signal obtained by subtracting said second current compensation signal and said first current compensation signal from said torque command signal is used as a new torque equivalent current command.

16. A position control unit for an electric motor according to claim 15; wherein said second vibration suppressing means has a positional deviation sign determining circuit for outputting a polarity of a positional deviation from a target positioning point according to said positional command signal and said actual rotation angle signal, and gives a specified gain to a polarity output from said positional deviation sign determining circuit and outputs said second current compensation signal.

17. A positional control unit for an electric motor comprising:

a position detection means for detecting a position of the electric motor and outputting a position detecting signal;

a torque command computing means for outputting a torque command signal according to a positional command signal received from a source external to the position control unit and said position detecting signal;

a torque equivalent detecting means for detecting a current of said electric motor indicating a torque of said electric motor and outputting a torque equivalent signal; and a torque control means for controlling a torque of said electric motor according to said torque command signal and said torque equivalent signal; wherein said torque control means comprises:

a first subtracter for subtracting a first current compensation signal and a second current compensation signal from said torque command signal to produce a torque equivalent current command signal;

a second subtracter for subtracting a torque equivalent current signal from said torque equivalent current command signal to produce a deviation signal;

an angular speed estimating means for receiving the deviation signal and for outputting estimated angular speed;

a positional deviation sign determination means for receiving the positional command signal and an actual rotation angle signal from a rotation detector and outputting a polarity signal indicating polarity of a positional deviation from a target positioning point;

an estimated angular speed correcting means for receiving a polarity signal from said positional deviation sign determination means and an estimated angular speed from said angular speed estimating means and correcting said estimated angular speed;

first vibration suppressing means for receiving an estimated angular speed signal from said angular speed estimating means and outputting a signal which is said first current compensation signal so that the actual angular speed will be reduced with desired response characteristics; and a second vibration suppressing means for receiving said polarity signal from said positional deviation sign determination means and outputting a second current compensation signal so that a positional deviation from a target positioning point will be reduced; and wherein the deviation signal obtained by subtracting said second current compensation signal, a second vibration suppression signal from said second vibration suppressing means and the first current compensation signal from the torque equivalent command signal is used as a new torque equivalent current command.

* * * * *